US012062200B2

(12) United States Patent
McCormac et al.

(10) Patent No.: US 12,062,200 B2
(45) Date of Patent: Aug. 13, 2024

(54) MAPPING OBJECT INSTANCES USING VIDEO DATA

(71) Applicant: Imperial College Innovations Limited, London (GB)

(72) Inventors: John Brendan McCormac, Banbridge (GB); Ronald Clark, Cambridge (GB); Michael Bloesch, London (GB); Andrew Davison, London (GB); Stefan Leutenegger, Munich (DE)

(73) Assignee: Imperial College Innovations Limited, London (GB)

( * ) Notice: Subject to any disclaimer, the term of this patent is extended or adjusted under 35 U.S.C. 154(b) by 288 days.

(21) Appl. No.: 17/173,829

(22) Filed: Feb. 11, 2021

(65) Prior Publication Data

US 2021/0166426 A1  Jun. 3, 2021

Related U.S. Application Data

(63) Continuation of application No. PCT/GB2019/052215, filed on Aug. 7, 2019.

(30) Foreign Application Priority Data

Aug. 13, 2018 (GB) .................... 1813197

(51) Int. Cl.
*G06T 7/579* (2017.01)
*G05D 1/00* (2024.01)
(Continued)

(52) U.S. Cl.
CPC ........... *G06T 7/579* (2017.01); *G05D 1/0251* (2013.01); *G05D 1/0253* (2013.01); *G06F 18/25* (2023.01);
(Continued)

(58) Field of Classification Search
CPC . G06T 7/579; G06T 7/11; G06T 7/251; G06T 7/30; G06T 7/50; G06T 7/75;
(Continued)

(56) References Cited

U.S. PATENT DOCUMENTS

2018/0144458 A1   5/2018  Xu et al.
2020/0298411 A1*  9/2020  Feiten ................. B25J 9/1664
2022/0101635 A1*  3/2022  Koivisto ............. G06N 3/045

FOREIGN PATENT DOCUMENTS

EP   3131060        2/2017
JP   4946535 B2 *  6/2012

OTHER PUBLICATIONS

"Renato F. Salas-Moreno et. al. SLAM++: Simultaneous Localisation and Mapping at the Level of Objects, Computer Vision Foundation, 2013, pp. 1352-1359" (Year: 2013).*

(Continued)

*Primary Examiner* — Andrae S Allison
*Assistant Examiner* — Phuong Hau Cai
(74) *Attorney, Agent, or Firm* — EIP US LLP

(57) ABSTRACT

A method comprising applying an object recognition pipeline to frames of video data. The object recognition pipeline provides a mask output of objects detected in the frames. The method includes fusing the mask output of the object recognition pipeline with depth data associated with the frames of video data to generate a map of object instances, including projecting the mask output to a model space for the map of object instances using a camera pose estimate and the depth data. An object instance in the map of object instances is defined using surface-distance metric values within a three-dimensional object volume, and has an object pose estimate indicating a transformation of the object (Continued)

instance to the model space. The object pose estimate and the camera pose estimate form nodes of a pose graph for the map of model instances.

20 Claims, 6 Drawing Sheets

(51) Int. Cl.
    *G06F 18/25*     (2023.01)
    *G06T 7/11*     (2017.01)
    *G06T 7/246*     (2017.01)
    *G06T 7/30*     (2017.01)
    *G06T 7/50*     (2017.01)
    *G06T 7/73*     (2017.01)
    *G06V 20/40*     (2022.01)

(52) U.S. Cl.
    CPC ............... *G06T 7/11* (2017.01); *G06T 7/251* (2017.01); *G06T 7/30* (2017.01); *G06T 7/50* (2017.01); *G06T 7/75* (2017.01); *G06V 20/46* (2022.01); *G06T 2207/10016* (2013.01); *G06T 2207/10024* (2013.01); *G06T 2207/10028* (2013.01); *G06T 2207/20072* (2013.01); *G06T 2207/20076* (2013.01); *G06T 2207/20084* (2013.01); *G06T 2207/30244* (2013.01)

(58) Field of Classification Search
    CPC . G06T 2207/10016; G06T 2207/10024; G06T 2207/10028; G06T 2207/20072; G06T 2207/20076; G06T 2207/20084; G06T 2207/30244; G06T 2207/20016; G06T 7/162; G06T 7/174; G06T 7/194; G06T 7/73; G05D 1/0251; G05D 1/0253; G06F 18/25; G06V 20/46; G06V 10/464
    See application file for complete search history.

(56) References Cited

OTHER PUBLICATIONS

"Kaan Yucer et. al. Efficient 3D Object Segmentation from Densely Sampled Light Fields with Applications to 3D Reconstruction, Mar. 2016, ACM Transactions on Graphics, vol. 35, No. 3, Article 22, Publication date: Mar. 2016" (Year: 2016).*
"Ryusuke Sagawa et. al. Incremental Mesh Modeling and Hierarchical Object Recognition using Multiple Range Images, 2000, Information Engineering Course, University of Tokyo 7-3-1, Hongou, Bunkpou-ku, Tokyo, 113-8656 Japan" (Year: 2000).*
"Keni Bernardin et. al. Evaluating Multiple Object Tracking Performance: The CLEAR MOT Metrics, 2008, Hindawi Publishing Corporation EURASIP Journal on Image and Video Processing vol. 2008, Article ID 246309, 10 pages" (Year: 2008).*
"Hee Seok Lee et. al. Simultaneous Traffic Sign Detection and Boundary Estimation Using Convolutional Neural Network, May 2018, IEEE Transactions on Intelligent Transportation Systems, vol. 19, No. 5, pp. 1625-1663" (Year: 2018).*
"Cesar Debeunne et. al., A Review of Visual-LiDAR Fusion based Simultaneous Localization and Mapping, Sensors, Special Issue Autonomous Mobile Robots: Real-Time Sensing, Navigation and Control, Mar. 2020" (Year: 2020).*
"Renato F. Salas-Moreno, Dense Semantic SLAM, Oct. 2014, Imperial College London Department of Computing, Submitted in part fulfillment of the requirements for the degree of PhD in Computing and the Diploma of Imperial College London" (Year: 2014).*
"Renato F. Salas-Moreno et. al., Dense Planar SLAM, Sep. 2014, IEEE International Symposium on Mixed and Augmented Reality 2014 Science and Technology Proceedings, Munich, Germany" (Year: 2014).*
Fioraio Nicola et al: "Towards Semantic KinectFusion", Sep. 9, 2013 (Sep. 9, 2013), Intelligent Vitrtual Agent. Iva 2015. LNCS; [Lecture Notes in Computer Science; Lect.Notes Computer], Springer, Berlin. Heidelberg, pp. 299-308, XP04470626, ISBN: 978-3-642-17318-9 p. 200-p. 304.
Cavallari Tommaso et al: "Volume-Based Semantic Labeling with Signed Distance Functions", Feb. 4, 2016 (Feb. 4, 2016), Intelligent Virtual Agent. Iva 2015. LNCS; [Lecture Notes in Computer Science; Lect.Notes Computer], Springer, Berlin, Heidelberg, pp. 544-556, XP047335555, isbn: 978-3-642-17318-9 [retrieved on Feb. 4, 2016] p. 547-p. 548.
Kaiming He et al: "Mask R-CNN", Jan. 24, 2018 (Jan. 24, 2018), XP055621354, Retrieved from the Internet: URL: https://arxiv.org/pdf/1703.06870.pdf [retrieved on Sep. 11, 2019] p. 2-p. 6.
Quang-Hieu Pham et al: "Real-time Progressive 3D Semantic Segmentation for for Indoor Scenes", Apr. 1, 2018 (Jan. 24, 2018), pp. 1-16, XP055637841, Retrieved from the Internet: URL:https://arxiv.org/pdf/1804.00257v1.pdf [retrieved on Oct. 31, 2019] p. 3-p. 8.
Cavallari Tommaso et al: "SemanticFusion: Joint Labeling, Tracking and Mapping", Nov. 24, 2016 (Nov. 24, 2016), Intelligent Virtual Agent. Iva 2015. LNCS; [Lecture Notes in Computer Science; Lect.Notes Computer], Springer, Berlin, Heidelberg, pp. 648-664, XP047363181, ISBN: 978-3-642-17318-9 [retrieved on Nov. 24, 2016] p. 651-p. 656.
Combined Search and Examination Report dated Feb. 18, 2019 for GB Application No. GB1813197.9.
International Search Report and Written Opinion dated Dec. 5, 2019 for PCT Application No. PCT/GB2019/052215.
"Meaningful Maps With Object-Oriented Semantic Mapping" by N. Sünderhauf, T. T. Pham, Y. Latif, M. Milford, and I. Reid, as set out in the Proceedings of the IEEE/RSJ Conference on Intelligent Robots and Systems (IROS), Feb. 2017.
"SLAM with object discovery, modeling and mapping", by S. Choudhary, A. J. B. Trevor, H. I. Christensen, and F. Dellaert, as set out in the Proceedings of the IEEE/RSJ Conference on Intelligent Robots and Systems (IROS), Feb. 2014.
"A Volumetric Method for Building Complex Models from Range Images" by Curless and Levoy as published in the Proceedings of SIGGRAPH '96, the 23rd annual conference on Computer Graphics and Interactive Techniques, ACM, 1996.
"KinectFusion: Real-Time Dense Surface Mapping and Tracking" by Newcombe et al as published in the Proceedings of the 24th annual ACM symposium on User Interface Software and Technology, ACM, 2011.
NYU Depth Dataset V2 as discussed by N. Silberman et al. in Indoor Segmentation and Support Inference from RGBD Images published in ECCV 2012.
SLAM++: Simultaneous Localisation and Mapping at the Level of Objects—Renato F. Salas-Moreno, Richard A. Newcombe, Hauke Strasdat, Paul H. J. Kelly, Andrew J. Davison, CVPR 2013.
Probabilistic Data Association for Semantic SLAM—Sean L. Bowman, Nikolay Atanasov, Kostas Daniilidis, George J. Pappas, ICRA 2017.
Semantic Instance Segmentation via Deep Metric Learning—Alireza Fathi, Zbigniew Wojna, Vivek Rathod, Peng Wang, Hyun Oh Song, Sergio Guadarrama, Kevin P. Murphy, Mar. 2017.
Self-supervised Visual Descriptor Learning for Dense Correspondence—Tanner Schmidt, Richard Newcombe, and Dieter Fox, ICRA 2017.
Chinese Office Action and Search Report dated May 23, 2024 for Chinese Patent Application No. 2019800539022.

\* cited by examiner

MAPPING OBJECT INSTANCES USING VIDEO DATA

CROSS-REFERENCE TO RELATED APPLICATIONS

This application is a continuation of International Application No. PCT/GB2019/052215, filed Aug. 7, 2019, which claims priority to GB Application No. GB1813197.9, filed Aug. 13, 2018, under 35 U.S.C. § 119(a). Each of the above-referenced patent applications is incorporated by reference in its entirety.

BACKGROUND OF THE INVENTION

Technical Field

The present invention relates to image processing. In particular, the present invention relates to processing frames of video data to generate a map of object instances, where the object instances correspond to objects that exist within a three-dimensional (3D) environment. The invention has particular, but not exclusive, relevance to generating a map of object instances that may be used by a robotic device to navigate and/or interact with its environment.

Background

In the field of computer vision and robotics, there is often a need to construct a representation of a 3D space. Constructing a representation of a 3D space allows a real-world environment to be mapped to a virtual or digital realm, where it may be used and manipulated by electronic devices. For example, in augmented reality applications, a user may use a handheld device to interact with virtual objects that correspond to entities in a surrounding environment, or a moveable robotic device may require a representation of a 3D space to allow simultaneously location and mapping, and thus navigation of its environment. In many applications there may be a need for intelligent systems to have a representation of an environment, so as to couple digital information sources to physical objects. This then allows advanced human-machine interfaces, where the physical environment surrounding a person becomes the interface. In a similar manner, such representations may also enable advanced machine-world interfaces, e.g. enabling robotic devices to interact with and manipulate physical objects in a real-world environment.

There are several techniques available for constructing a representation of a 3D space. For example, structure from motion and multi-view stereo are two such techniques. Many techniques extract features from images of the 3D space, such as corners and/or edges, e.g. using Scale Invariant Feature Transforms (SIFT) and/or Speeded Up Robust Features (SURF) algorithms. These extracted features may then be correlated from image to image to build a 3D representation. This 3D representation is typically provided as a 3D point cloud, i.e. as a series of defined X, Y and Z co-ordinates within a defined volume for the 3D space. In certain cases, a point cloud may be converted to a polygon mesh for rendering on a display, in a process known as surface rendering.

Once a 3D representation of a space has been generated there is then a further problem of the utility of the representation. For example, many robotics applications not only need a definition of points within the space but also require useful information regarding what is present in the space. This is referred to in computer vision fields as "semantic" knowledge of the space. Knowing what is present within a space is a process that happens subconsciously in the human brain; as such it is easy to underestimate the difficulty of constructing a machine with equivalent abilities. For example, when human beings observe an object such as a cup in a 3D space, many different areas of the brain are activated in additional to core visual processing networks including those relating to proprioception (e.g. movement towards the object) and language processing. However, many computer vision systems have a very naïve understanding of a space, for example, a "map" of an environment may be seen as a 3D image where visible points in the image have colour information but lack any data that segments the points into discrete entities.

Research into generating useable representations of a 3D space is still in its infancy. In the past, effort has primarily been divided between the relatively separate fields of two-dimensional (2D) image classification (e.g. "does this image of a scene contain a cat?") and 3D scene mapping, such as Simultaneous Location And Mapping (SLAM) systems. In the latter category, there is an additional challenge of designing efficient mapping systems that can operate in real-time. For example, many of the existing systems need to operate off-line on large datasets (e.g. overnight or over a series of days). It is desired to provide 3D scene mapping in real-time for real-world applications.

The paper "Meaningful Maps With Object-Oriented Semantic Mapping" by N. Sünderhauf, T. T. Pham, Y. Latif, M. Milford, and I. Reid, as set out in the Proceedings of the IEEE/RSJ Conference on Intelligent Robots and Systems (IROS), 2017.2, describes how intelligent robots must understand both the geometric and semantic properties of the scene surrounding them to interact in meaningful ways with their environment. As set out above, they state that a majority of research to date has addressed these mapping challenges separately, focusing on either geometric or semantic mapping. In the present paper, they seek to build environmental maps that include both semantically meaningful, object-level entities and point- or mesh-based geometrical representations. Geometric point cloud models of previously unseen instances of known object classes are built simultaneously with a map that contains these object models as central entities. The presented system uses sparse, feature-based SLAM, image-based deep-learning object detection and 3D unsupervised segmentation. While this approach has promise, it uses a complex three-lane image processing pipeline made up of an ORB-SLAM path, a Single-shot Multi-box Detector (SSD) path and a 3D segmentation path, with the separate paths running in parallel on Red, Green, Blue (RGB) and Depth (i.e. RGB-D) data. The authors also indicate that there are certain issues with object detection, including false negative detections, i.e. the system often fails to map existing objects.

In the paper "SLAM with object discovery, modeling and mapping", by S. Choudhary, A. J. B. Trevor, H. I. Christensen, and F. Dellaert, as set out in the Proceedings of the IEEE/RSJ Conference on Intelligent Robots and Systems (IROS), 2014.2, an approach for online object discovery and object modelling is described. A SLAM system is extended to utilize discovered and modelled objects as landmarks to help localize a robot in an online manner. Such landmarks are deemed useful for detecting loop closures in larger maps. In addition to the map, the system also outputs a database of detected object models for use in future SLAM or service robotic tasks. These methods generate a point cloud from RGB-D data, and perform connected-component analysis on the point cloud to generate 3D object segments in an unsupervised manner. It is described how the proposed methods suffer from false positive matches, such as those that result from repetitive objects.

The paper "MaskFusion: Real-Time Recognition, Tracking and Reconstruction of Multiple Moving Objects", by M. Rünz and L. Agapito describes an RGB-D SLAM system referred to as "MaskFusion". MaskFusion is described as being a real-time visual SLAM system that utilises semantic scene understanding (using Mask-RCNN) to map and track multiple objects. However, this paper explains that small objects are potentially difficult to track using the MaskFusion system. Furthermore, misclassifications are not accounted for.

Given existing techniques, there is a desire for useable and efficient methods of processing video data to enable mapping of objects present in a three-dimensional space.

SUMMARY

According to a first aspect of the present invention there is provided a method, comprising: applying an object recognition pipeline to frames of video data, the object recognition pipeline providing a mask output of objects detected in the frames; and fusing the mask output of the object recognition pipeline with depth data associated with the frames of video data to generate a map of object instances, including projecting the mask output to a model space for the map of object instances using a camera pose estimate and the depth data, wherein an object instance in the map of object instances is defined using surface-distance metric values within a three-dimensional object volume, and has an object pose estimate indicating a transformation of the object instance to the model space, wherein the object pose estimate and the camera pose estimate form nodes of a pose graph for the map of model instances.

In certain examples, fusing the mask output of the object recognition pipeline with depth data associated with the frames of video data comprises: estimating mask outputs for object instances using the camera pose estimate; and comparing the estimated mask outputs with the mask output of the object recognition pipeline to determine whether an object instance from the map of object instances is detected in a frame of the video data. In response to an absence of an existing object instance in the frame of video data, fusing the mask output of the object recognition pipeline with depth data associated with the frames of video data may comprise: adding a new object instance to the map of object instances; and adding a new object pose estimate to the pose graph. Fusing the mask output of the object recognition pipeline with depth data associated with the frames of video data may comprise: responsive to a detected object instance, updating the surface-distance metric values based on at least one of image and depth data associated with the frame of video data.

In certain examples, the three-dimensional object volume comprises a set of voxels, wherein different object instances have different voxel resolutions within the map of object instances.

In certain examples, the surface-distance metric values are truncated signed distance function (TSDF) values.

In certain examples, the method includes determining, probabilistically, whether portions of the three-dimensional object volume for an object instance form part of a foreground.

In certain examples, the method includes determining an existence probability for an object instance in the map of object instances; and responsive to determining that a value of the existence probability is less than a predefined threshold, removing the object instance from the map of object instances.

In certain examples, the mask output comprises binary masks for a plurality of detected objects and respective confidence values. In these examples, the method may comprise filtering the mask output of the object recognition pipeline based on the confidence values before fusing the mask output.

In certain examples, the method comprises: computing an object-agnostic model of a three-dimensional environment containing the objects; and responsive to an absence of detected objects, using the object-agnostic model of the three-dimensional environment to provide frame-to-model tracking. In these examples, the method may include tracking an error between at least one of image and depth data associated with the frames of video data and the object-agnostic model; and responsive to the error exceeding a predefined threshold, performing relocalisation to align a current frame of the video data to the map of object instances, including optimising the pose graph.

According to a second aspect of the present invention there is provided a system, comprising: an object recognition pipeline comprising at least one processor to detect objects in frames of video data and to provide a mask output of objects detected in the frames; memory storing data defining a map of object instances, an object instance in the map of object instances being defined using surface-distance metric values within a three-dimensional object volume; memory storing data defining a pose graph for the map of object instances, the pose graph comprising nodes indicating camera pose estimates and object pose estimates, the object pose estimates indicating a position and orientation of the object instance in a model space; and a fusion engine comprising at least one processor to fuse the mask output of the object recognition pipeline with depth data associated with the frames of video data to populate the map of object instances, the fusion engine being configured to project the mask output to the model space for the map of object instances using nodes of the pose graph.

In certain examples, the fusion engine is configured to generate mask outputs for object instances within the map of object instances using the camera pose estimates, and to compare the generated mask outputs with the mask output of the object recognition pipeline to determine whether an object instance from the map of object instances is detected in a frame of video data.

In certain examples, the fusion engine is configured to, in response to an absence of an existing object instance in the frame of video data, add a new object instance to the map of object instances and a new node to the pose graph, the new node corresponding to an estimated object pose for the new object instance.

In certain examples, the system comprises memory storing data indicative of an object-agnostic model of a three-dimensional environment containing the objects. In these examples, the fusion engine may be configured to use the object-agnostic model of the three-dimensional environment to provide frame-to-model tracking responsive to an absence of detected object instances. In such cases, the system may include a tracking component comprising at least one processor to track an error between at least one of image and depth data associated with the frames of video data and the object-agnostic model, wherein, responsive to the error exceeding a predefined threshold, the model tracking engine is to optimise the pose graph.

In certain examples, the system includes at least one camera to provide the frames of video data, each frame of video data comprising an image component and a depth component.

In certain examples, the object recognition pipeline comprises a region-based convolutional neural network—RCNN—with a path for predicting image segmentation masks.

The system of the second aspect may be configured to implement any features of the first aspect of the present invention.

According to a third aspect of the present invention there is provided a robotic device comprising: at least one capture device to provide frames of video data comprising at least colour data; the system of the second aspect; one or more actuators to enable the robotic device to interact with a surrounding three-dimensional environment; and an interaction engine comprising at least one processor to control the one or more actuators, wherein the interaction engine is to use the map of object instances to interact with objects in the surrounding three-dimensional environment.

According to a fourth aspect of the present invention there is provided a non-transitory computer-readable storage medium comprising computer-executable instructions which, when executed by a processor, cause a computing device to perform any of the methods described above.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1A:
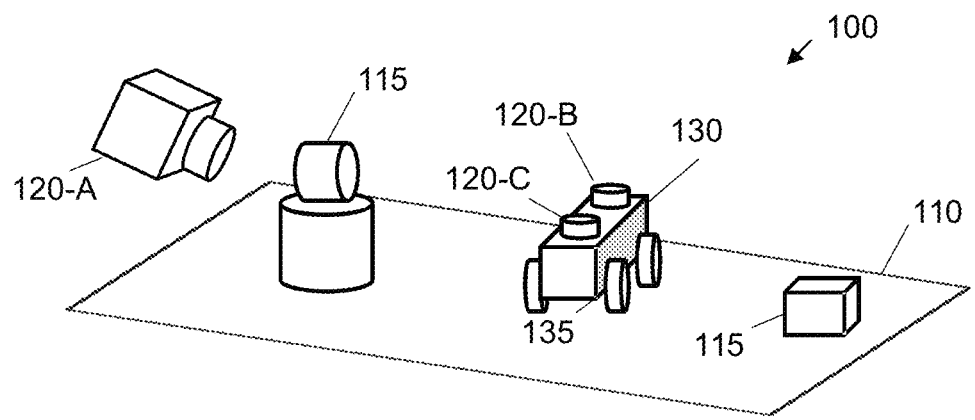
FIG. 1A is a schematic diagram showing an example of a three-dimensional (3D) space.

Certain examples described here enable objects within a surrounding environment to be mapped based on video data containing observations of the environment. An object recognition pipeline is applied to frames of this video data, e.g. in the form of a series of 2D images. The object recognition pipeline is configured to provide a mask output. The mask output may be provided in the form of mask images for objects that are detected in a particular frame. The mask output is fused with depth data associated with the frames of video data to generate a map of object instances. The depth data may comprise data from a Red, Green, Blue-Depth (RGB-D) capture device, and/or may be computed from RGB image data (e.g. using structure-from-motion approaches). Fusion may comprise projecting the mask output to a model space for the map of object instances using a camera pose estimate and the depth data, e.g. determining a 3D representation associated with the mask output and then updating an existing 3D representation based on the determined 3D representation, where the 3D representations are object-centric, i.e. are defined for each detected object.

Certain examples described herein generate a map of object instances. This map may comprise a set of object instances, where each object instance is defined using surface-distance metric values within a 3D object volume. Each object instance may also have a corresponding object pose estimate indicating a transformation of the object instance to the model space. The surface-distance metric values may indicate a normalised distance to a surface in the 3D object volume. The object pose estimate then indicates how the 3D object volume is to be transformed to align it with the model space. For example, an object instance may be seen to comprise a 3D representation independent of a model space and a transformation to align the representation within the model space.

Certain examples described herein use a pose graph to track both object pose estimates and the camera pose estimates. For example, both sets of estimates may form nodes of the pose graph. The camera pose estimates indicate how a position and orientation of a camera (i.e. a capture device) change as it moves around the surrounding environment, e.g. as it moves and records the video data. Nodes of the pose graph may be defined using six Degrees of Freedom (6DOF).

Using examples described herein an online object-centric SLAM system may be provided that builds a persistent and accurate 3D graph map of arbitrary reconstructed objects. Object instances may be stored as part of an optimisable 6DoF pose graph, which may be used as a map representation of the environment. Fusion of depth data may enable object instances to be incrementally refined, and the refined object instances may be used for tracking, relocalisation and loop closure detection. By using object instances defined using surface-distance metric values within a 3D object volume, loop-closures and/or pose graph optimisation cause adjustments in the object pose estimates but avoid intra-object warping, e.g. deformation of the representation within the 3D object volume is avoided.

Certain examples described herein enable object-centric representations of a 3D environment to be generated from video data, i.e. the space is mapped using data representing a set of discrete entities as opposed to a cloud of points in a 3D coordinate system. This may be seen as "detecting objects" viewable in a scene: where "detection" indicates that discrete data definitions corresponding to physical entities are generated based on video data representing an observation or measurement of the 3D environment (e.g. discrete entities are not generated for objects that are not present in the 3D environment). Here, "objects" may refer to any visible thing or entity with a material presence, e.g. that a robot may interact with. An "object" may correspond to collections of matter that a human being can label. Object here is considered broadly and includes, amongst many others, entities such as walls, doors, floors and people as well as furniture, other devices, and conventional objects in a home, office and/or exterior space.

A map of object instances, as generated by examples described herein, enables computer vision and/or robotic applications to interact with a 3D environment. For example, if a map for a household robot comprises data identifying objects within a space, the robot can distinguish a 'tea cup' from a 'table'. The robot may then apply appropriate actuator patterns to grasp areas on objects having mapped object instances, e.g. enabling the robot to move the 'tea cup' separately from the 'table'.

Figure 1B:
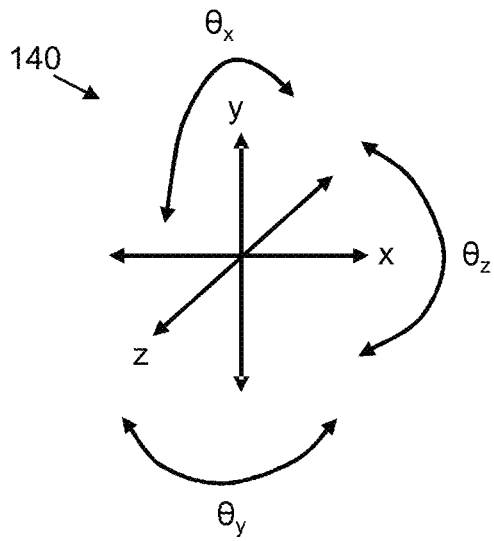
FIG. 1B is a schematic diagram showing available degrees of freedom for an example object in 3D space.
Figure 1B:
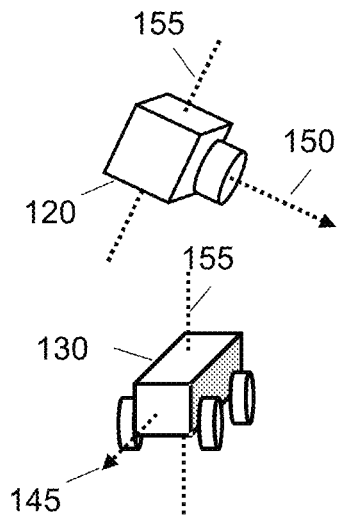
Figure 1C:
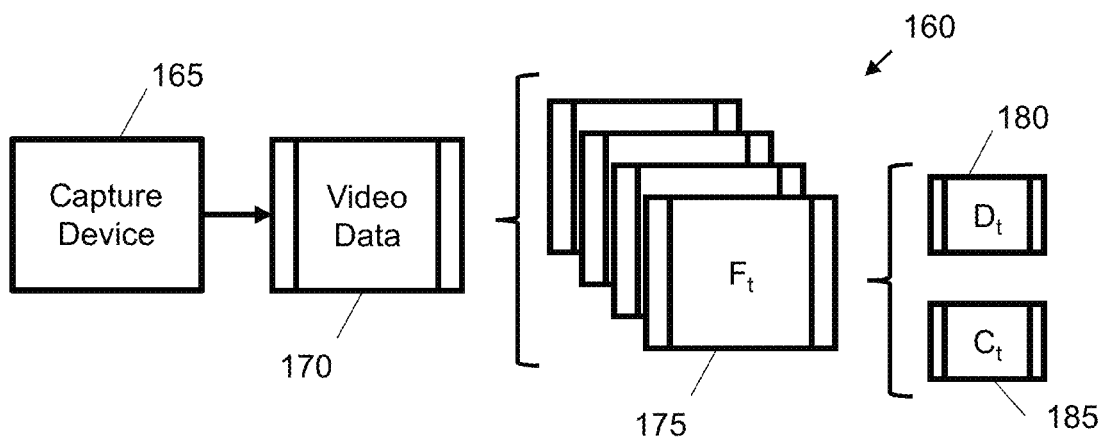
FIG. 1C is a schematic diagram showing video data generated by an example capture device.

FIGS. 1A and 1B schematically show an example of a 3D space and the capture of video data associated with that space. FIG. 1C then shows a capture device configured to generate video data when viewing the space. These examples are presented to better explain certain features described herein and should not be considered limiting; certain features have been omitted and simplified for ease of explanation.

FIG. 1A shows an example 100 of a three-dimensional space 110. The 3D space 110 may be an internal and/or an external physical space, e.g. at least a portion of a room or a geographical location. The 3D space 110 in this example 100 comprises a number of physical objects 115 that are located within the 3D space. These objects 115 may comprise one or more of, amongst others: people, electronic devices, furniture, animals, building portions and equipment. Although the 3D space 110 in FIG. 1A is shown with a lower surface this need not be the case in all implementations, for example an environment may be aerial or within extra-terrestrial space.

The example 100 also shows various example capture devices 120-A, 120-B, 120-C (collectively referred to with the reference numeral 120) that may be used to capture video data associated with the 3D space 110. A capture device, such as the capture device 120-A of FIG. 1A, may comprise a camera that is arranged to record data that results from observing the 3D space 110, either in digital or analogue form. In certain cases, the capture device 120-A is moveable, e.g. may be arranged to capture different frames corresponding to different observed portions of the 3D space 110. The capture device 120-A may be moveable with reference to a static mounting, e.g. may comprise actuators to change the position and/or orientation of the camera with regard to the 3D space 110. In another case, the capture device 120-A may be a handheld device operated and moved by a human user.

In FIG. 1A, multiple capture devices 120-B, C are also shown coupled to a robotic device 130 that is arranged to move within the 3D space 110. The robotic device 130 may comprise an autonomous aerial and/or terrestrial mobile device. In the present example 100, the robotic device 130 comprises actuators 135 that enable the device to navigate the 3D space 110. These actuators 135 comprise wheels in the illustration; in other cases, they may comprise tracks, burrowing mechanisms, rotors, etc. One or more capture devices 120-B, C may be statically or moveably mounted on such a device. In certain cases, a robotic device may be statically mounted within the 3D space 110 but a portion of the device, such as arms or other actuators, may be arranged to move within the space and interact with objects within the space. Each capture device 120-B, C may capture a different type of video data and/or may comprise a stereo image source. In one case, capture device 120-B may capture depth data, e.g. using a remote sensing technology such as infrared, ultrasound and/or radar (including Light Detection and Ranging—LIDAR technologies), while capture device 120-C captures photometric data, e.g. colour or grayscale images (or vice versa). In one case, one or more of the capture devices 120-B, C may be moveable independently of the robotic device 130. In one case, one or more of the capture devices 120-B, C may be mounted upon a rotating mechanism, e.g. that rotates in an angled arc and/or that rotates by 360 degrees, and/or is arranged with adapted optics to capture a panorama of a scene (e.g. up to a full 360 degree panorama).

FIG. 1B shows an example 140 of degrees of freedom available to a capture device 120 and/or a robotic device 130. In the case of a capture device such as 120-A, a direction 150 of the device may be co-linear with the axis of a lens or other imaging apparatus. As an example of rotation about one of the three axes, a normal axis 155 is shown in the Figures. Similarly, in the case of the robotic device 130, a direction of alignment 145 of the robotic device 130 may be defined. This may indicate a facing of the robotic device and/or a direction of travel. A normal axis 155 is also shown. Although only a single normal axis is shown with reference to the capture device 120 or the robotic device 130, these devices may rotate around any one or more of the axes shown schematically as 140 as described below.

More generally, an orientation and location of a capture device may be defined in three-dimensions with reference to six degrees of freedom (6DOF): a location may be defined within each of the three dimensions, e.g. by an [x, y, z] co-ordinate, and an orientation may be defined by an angle vector representing a rotation about each of the three axes, e.g. [$\theta_x$, $\theta_y$, $\theta_z$]. Location and orientation may be seen as a transformation within three-dimensions, e.g. with respect to an origin defined within a 3D coordinate system. For example, the [x, y, z] co-ordinate may represent a translation from the origin to a particular location within the 3D coordinate system and the angle vector—[$\theta_x$, $\theta_y$, $\theta_z$]—may define a rotation within the 3D coordinate system. A transformation having 6DOF may be defined as a matrix, such that multiplication by the matrix applies the transformation. In certain implementations, a capture device may be defined with reference to a restricted set of these six degrees of freedom, e.g. for a capture device on a ground vehicle the y-dimension may be constant. In certain implementations, such as that of the robotic device 130, an orientation and location of a capture device coupled to another device may be defined with reference to the orientation and location of that other device, e.g. may be defined with reference to the orientation and location of the robotic device 130.

In examples described herein, the orientation and location of a capture device, e.g. as set out in a 6DOF transformation matrix, may be defined as the pose of the capture device. Likewise, the orientation and location of an object representation, e.g. as set out in a 6DOF transformation matrix, may be defined as the pose of the object representation. The pose of a capture device may vary over time, e.g. as video data is recorded, such that a capture device may have a different pose at a time t+1 than at a time t. In a case of a handheld mobile computing device comprising a capture device, the pose may vary as the handheld device is moved by a user within the 3D space 110.

FIG. 1C shows schematically an example of a capture device configuration. In the example 160 of FIG. 1C, a capture device 165 is configured to generate video data 170. Video data comprises image data that varies with time. If the capture device 165 is a digital camera this may be performed directly, e.g. video data 170 may comprise processed data from a charge-coupled device or complementary metal-oxide-semiconductor (CMOS) sensor. It is also possible to generate video data 170 indirectly, e.g. through processing other image sources such as converting analogue signal sources.

In FIG. 1C, the image data 170 comprises a plurality of frames 175. Each frame 175 may relate to a particular time tin a time period over which images of a 3D space, such as 110 in FIG. 1, are captured (i.e. $F_t$). A frame 175 generally consists of a 2D representation of measured data. For example, a frame 175 may comprise a 2D array or matrix of recorded pixel values at time t. In the example of FIG. 1C, all frames 175 within the video data are the same size, although this need not be the case in all examples. Pixel values within a frame 175 represent a measurement of a particular portion of the 3D space.

In the example of FIG. 1C, each frame 175 comprises values for two different forms of image data. A first set of values relate to depth data 180 (e.g. $D_t$). The depth data may comprise an indication of a distance from the capture device, e.g. each pixel or image element value may represent a distance of a portion of the 3D space from the capture device 165. A second set of values relate to photometric data 185 (e.g. colour data $C_t$). These values may comprise Red, Green, Blue pixel values for a given resolution. In other examples, other colour spaces may be used and/or photometric data 185 may comprise mono or grayscale pixel values. In one case, video data 170 may comprise a compressed video stream or file. In this case, frames of video data may be reconstructed from the stream or file, e.g. as the output of a video decoder. Video data may be retrieved from memory locations following pre-processing of video streams or files.

The capture device 165 of FIG. 1C may comprise a so-called RGB-D camera that is arranged to capture both RGB data 185 and depth ("D") data 180. In one case, the RGB-D camera is arranged to capture video data over time. One or more of the depth data 180 and the RGB data 185 may be used at any one time. In certain cases, RGB-D data may be combined in a single frame with four or more channels. The depth data 180 may be generated by one or more techniques known in the art, such as a structured light approach wherein an infrared laser projector projects a pattern of infrared light over an observed portion of a three-dimensional space, which is then imaged by a monochrome CMOS image sensor. Examples of these cameras include the Kinect® camera range manufactured by Microsoft Corporation, of Redmond, Washington in the United States of America, the Xtion® camera range manufactured by ASUSTeK Computer Inc. of Taipei, Taiwan and the Carmine® camera range manufactured by PrimeSense, a subsidiary of Apple Inc. of Cupertino, California in the United States of America. In certain examples, an RGB-D camera may be incorporated into a mobile computing device such as a tablet, laptop or mobile telephone. In other examples, an RGB-D camera may be used as a peripheral for a static computing device or may be embedded in a stand-alone device with dedicated processing capabilities. In one case, the capture device 165 may be arranged to store the video data 170 in a coupled data storage device. In another case, the capture device 165 may transmit video data 170 to a coupled computing device, e.g. as a stream of data or on a frame-by-frame basis. The coupled computing device may be directly coupled, e.g. via a universal serial bus (USB) connection, or indirectly coupled, e.g. the video data 170 may be transmitted over one or more computer networks. In yet another case, the capture device 165 may be configured to transmit the video data 170 across one or more computer networks for storage in a network attached storage device. Video data 170 may be stored and/or transmitted on a frame-by-frame basis or in a batch basis, e.g. a plurality of frames may be bundled together. The depth data 180 need not be at the same resolution or frame-rate as the photometric data 185. For example, the depth data 180 may be measured at a lower resolution than the photometric data 185. One or more pre-processing operations may also be performed on the video data 170 before it is used in the later-described examples. In one case, pre-processing may be applied such that the two frame sets have a common size and resolution. In certain cases, separate capture devices may respectively generate depth and photometric data. Further configurations not described herein are also possible.

In certain cases, the capture device may be arranged to perform pre-processing to generate depth data. For example, a hardware sensing device may generate disparity data or data in the form of a plurality of stereo images, wherein one or more of software and hardware are used to process this data to compute depth information. Similarly, depth data may alternatively arise from a time of flight camera that outputs phase images that may be used to reconstruct depth information. As such any suitable technique may be used to generate depth data as described in examples herein.

FIG. 1C is provided as an example and, as will be appreciated, different configurations than those shown in the Figure may be used to generate video data 170 for use in the methods and systems described below. Video data 170 may further comprise any measured sensory input that is arranged in a two-dimensional form representative of a captured or recorded view of a 3D space. For example, this may comprise just one of depth data or photometric data, electromagnetic imaging, ultrasonic imaging and radar output, amongst others. In these cases, only an imaging device associated with the particular form of data may be required, e.g. an RGB device without depth data. In the examples above, frames of depth data $D_t$ may comprise a two-dimensional matrix of depth values. This may be represented as a grayscale image, e.g. where each [x, y] pixel value in a frame having a resolution of $x_{R1}$ by $y_{R1}$ comprises a depth value, d, representing a distance from the capture device of a surface in the three-dimensional space. Frames of photometric data $C_t$ may comprise a colour image, where each [x, y] pixel value in a frame having a resolution of $x_{R2}$ by $y_{R2}$ comprises an RGB vector [R, G, B]. As an example, the resolution of both sets of data may be 640 by 480 pixels.

Figure 2:
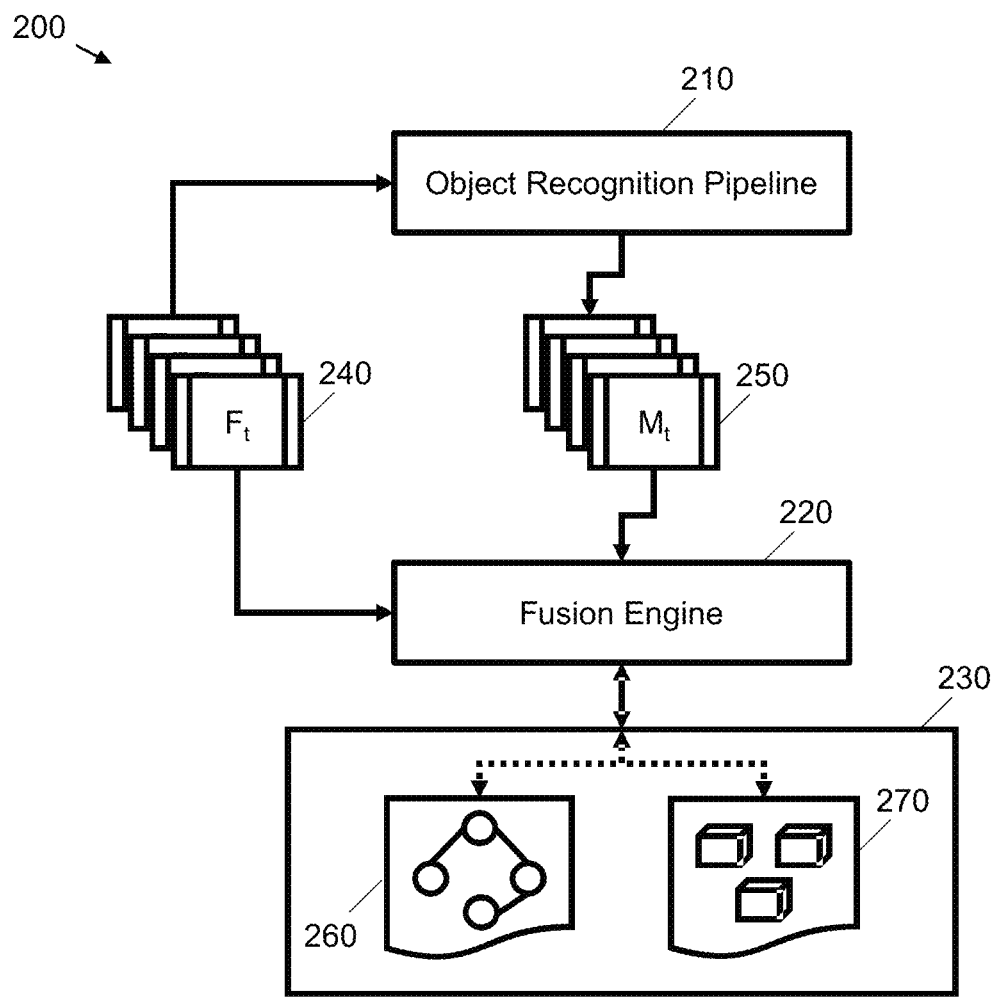
FIG. 2 is a schematic diagram of a system for generating a map of object instances using video data according to an example.

FIG. 2 shows an example system 200 for generating a map of object instances. The system of FIG. 2 comprises an object recognition pipeline 210, a fusion engine 220 and memory 230. The object recognition pipeline 210 and the fusion engine 220 comprise at least one processor to process data as described herein. The object recognition pipeline 210 and the fusion engine 220 may be implemented by way of dedicated integrated circuits having processors, e.g. application-specific integrated circuits (ASICs) or field-programmable gate arrays (FPGAs), and/or general-purpose processors, such as one or more central processing units and graphical processing units. The processors of the object recognition pipeline 210 and the fusion engine 220 may have one or more processing cores, with processing distributed over the cores. The object recognition pipeline 210 and the fusion engine 220 may be implemented as separate electronic components, e.g. with external interfaces to send and receive data, and/or may form part of a common computing system (e.g. their processors may comprise a common set of one or more processors in a computing device). The object recognition pipeline 210 and the fusion engine 220 may comprise associated memory and/or persistent storage to store computer program code for execution by the processors to provide the functionality described herein. In one case, the object recognition pipeline 210 and the fusion engine 220 may use memory 230 to store computer program code for execution; in other cases, they may use separate memory.

In FIG. 2, the object recognition pipeline 210 is configured to detect objects in frames of video data 240 and to provide a mask output 250 of objects detected in the frames. The video data may be video data as described previously, e.g. RGB or RGB-D data. The mask output may comprise a set of images, wherein each image corresponds to an object detected in a given frame of video data by the object recognition pipeline 210. The mask output may be in the form of binary images, where a value of '1' indicates that a pixel in a frame of video data is deemed to be associated with a detected object, and a value of '0' indicates that a pixel in the frame of video data is not associated with a detected object. In other cases, the mask output comprises one or more channels, e.g. each mask image may comprise an n-bit grayscale value where the value represents a probability that a pixel is associated with a particular object (e.g. for an 8-bit image, a value of 255 may represent a probability of 1). In certain cases, the mask output may comprise an O-channel image, where each channel represents a different one of O objects; in other cases, different images may be output for each detected object.

The fusion engine 220 is configured to access the memory 230 and update data stored therein. In FIG. 2, the memory 230 stores data defining a pose graph 260 and data defining a map of object instances 270. Although these are shown in FIG. 2 as comprising two separate data entities, they may form part of a common data entity, such as a map or representation of a surrounding environment. Memory may comprise volatile and/or non-volatile memory, such as random access memory or a hard disk drive (e.g. based on solid storage or magnetic storage). In use, data defining the complete pose graph 260 and map of object instances 270 may be stored in volatile memory; in other cases, only a portion may be stored in volatile memory and a persistent copy of this data may be maintained on non-volatile storage. Configurations of memory 230 will depend on applications and available resources.

In FIG. 2, the fusion engine 220 is configured to fuse the mask output 250 of the object recognition pipeline with depth data associated with the frames of video data 240 to populate the map of object instances 270. For example, the fusion engine 220 may use depth data stored in a depth channel (D) of frames of RGB-D video data. Alternatively, the fusion engine 220 may comprise, or be communicatively-coupled to, a depth processor arranged to generate depth data from the frames of video data 240. The fusion engine 220 is configured to project the mask output 250 to a model space for the map of object instances using nodes of the pose graph 260. In this case, a "model space" may comprise a 3D coordinate system that is defined to model a surrounding environment that features in the frames of video data 240. An origin of this model space may be defined arbitrarily. The model space represents the "world" of the surrounding environment and may be contrasted with the "object space" of each object instance. In present examples, the map of object instances 270 comprises data definitions for one or more discrete entities that correspond to objects detected in the surrounding environment, e.g. as defined by the mask output 250. An object instance in the map of object instances may be defined using surface-distance metric values within a 3D object volume (an "object space"). An object pose estimate may then also be defined for a detected object to map the object as defined in the object space to the model space. For example, a definition in object space may represent a default position and orientation of an object (e.g. a 'tea cup' as orientated on a planar horizontal surface), and the object pose estimate may comprise a transformation that maps the position (i.e. location) and orientation in the object space to a location and orientation in the world of the surrounding environment (e.g. the 'tea cup' may be rotated, tilted or placed upside down in the environment as observed in the video data, and may be translated relative to a defined origin of the model space—e.g. have a position or location in the model space reflective of a position or location relative to other objects in the surrounding environment). The object pose estimates may be stored as nodes of the pose graph 260, together with camera pose estimates. The camera pose estimates indicate a position and orientation of a capture device as time progresses through the frames of video data. For example, the video data may be recorded by moving a capture device (such as a RGB-D camera) around an environment (such as an interior of a room). At least a subset of the frames of video data may thus have corresponding camera pose estimates representing the position and orientation of the capture device at the time the frame was recorded. Camera pose estimates may not exist for all frames of video data, but may be determined for a subset of times within the recorded time range of the video data.

The system of FIG. 2 may be implemented using at least two parallel processing threads: one thread implementing the object recognition pipeline 210 and the other thread implementing the fusion engine 220. The object recognition pipeline 210 operates on 2D images, whereas the fusion engine 220 manipulates 3D representations of objects. The arrangement shown in FIG. 2 thus may be provided efficiently and operate in real-time on obtained video data. In other cases, though, some or all of the processing of the video data may not occur in real-time. Using an object recognition pipeline that generates a mask output enables simple fusion with depth data without unsupervised 3D segmentation, which may be less accurate than the method of examples herein. The object instances that result from the operation of the fusion engine 220 may be integrated with a pose graph of camera pose estimates, wherein object pose estimates may be added to the pose graph as objects are detected. This enables both tracking and 3D object detection to be combined, where the camera pose estimates are used to fuse the depth data. Camera pose estimates and object pose estimates may also be optimised together, e.g. when tracking is lost.

In one case, an object instance is initialised based on objects detected by the object recognition pipeline 210. For example, if the object recognition pipeline 210 detects a particular object in a frame of video data (e.g. 'cup' or 'computer'), it may output a mask image for that object as part of the mask output 250. On start-up, if no object instances are stored in the map of object instances 270, an object initialisation routine may commence. In this routine, pixels from the mask image for the detected object (e.g. defined in a 2D coordinate space such as at a 680×480 resolution) may be projected into the model space using a camera pose estimate for the frame of video data and depth data, e.g. from a D depth channel. In one case, points— $p_W$—in the model space (e.g. within a 3D coordinate system representing "W", the "World") for a frame—k—may be computed using a camera pose estimate—$T_{WC}^k$—for the frame, an intrinsic camera matrix—K (e.g. a 3×3 matrix), a binary mask—$M_i^k$ for an i-th detected object having image coordinates $u=(u_1, u_2)$—and a depth map—$D_k(u)$, e.g. as per:

$$p_W = T_{WC}^k K^{-1} D_k(u) u$$

Thus, for each mask image, a set of points in the model space may be mapped. These points are deemed to be associated with the detected object. To generate the object instance from this set of points, a volume centre may be computed. This may be computed based on a centre of the set of points. The set of points may be considered to form a point cloud. In certain cases, percentiles of the point cloud may be used to define a volume centre and/or a volume size. This for example avoids interference from distant background surfaces, which may be caused by a predicted boundary of a mask image being misaligned with respect to a depth boundary for a given object. These percentiles may be defined separately for each axis and may, for example, be chosen as the $10^{th}$ and $90^{th}$ percentiles of the point cloud (e.g. removing the bottom 10% and top 10% of values in the x, y and/or z axes). As such a volume centre may be defined as a centre for 80% of the values along each axis, and volume size a distance between the $90^{th}$ and $10^{th}$ percentiles. A padding factor may be applied to the volume size to account for erosion and/or other factors. In certain cases, volume centre and volume size may be recomputed based on mask images from subsequent detections.

In one case, the 3D object volume comprises a set of voxels (e.g. volumes within a regular grid in 3D space), where a surface-distance metric is associated with each voxel. Different object instances may have 3D object volumes of different resolutions. The 3D object volume resolution may be set based on object size. This object size may be based on the volume size discussed above. For example, if there are two objects having different volumes, e.g. containing points in model space, then an object with a smaller volume may have voxels of a smaller size than an object with a larger volume. In one case, each object instance may be allotted a 3D object volume of an initial fixed resolution (e.g. 64×64×64) and then a voxel size may be computed for the object instance by dividing an object volume size metric by the initial fixed resolution. This enables small objects to be reconstructed with fine details and large objects to be reconstructed more coarsely. In turn, this makes the map of object instances memory efficient, e.g. given available memory constraints.

In the particular cases described above, an object instance may be stored by computing surface-distance metric values for a 3D object volume based on obtained depth data (such as $D^k$ above). For example, a 3D object volume may be initialised as described above, and then surface measurements from the depth data may be stored as surface-distance metric values for voxels of the 3D object volume. The object instance may thus comprise a set of voxels at a number of locations.

As an example in which the surface-distance metric comprises a normalised truncated signed distance function (TSDF) value (described further with reference to FIG. 4), the TSDF values may be initialized to 0. Subsequently, each voxel within the 3D object volume may be projected into the model space using the object pose estimate and then projected into a camera frame using the camera pose estimate. The camera frame generated following this projection may then be compared with the depth data, and a surface-distance metric value updated for the voxel based on the comparison. For example, the depth of the voxel as projected into the camera frame may be subtracted from the measured depth (represented by the depth data) for the pixel the voxel projects to. This calculates the distance between the voxel and the surface of the object instance (which is for example a surface-distance metric, such as a signed distance function value). If the signed distance function is deeper into the object surface than a predetermined truncation threshold (such as with a depth value of greater than the depth measurement plus the truncation threshold), then the surface-distance metric value is not updated. Otherwise, the voxels in free space and just within the surface may be used to calculate the signed distance function value, which may be truncated to the truncation threshold to generate the TSDF value. For subsequent depth images, a weighted average approach may be taken by summing the TSDF values and dividing by the number of samples.

Certain examples described herein thus provide consistent object instance mapping and allow for classification of numerous objects of previously unknown shape in real, cluttered indoor scenes. Certain described examples are designed to enable real-time or near real-time operation, based on a modular approach, with modules for image-based object-instance segmentation, data fusion and tracking, and pose graph generation. These examples allow a long-term map to be generated that focuses on salient object elements within a scene, and that enables variable, object size-dependent resolution.

Figure 3:
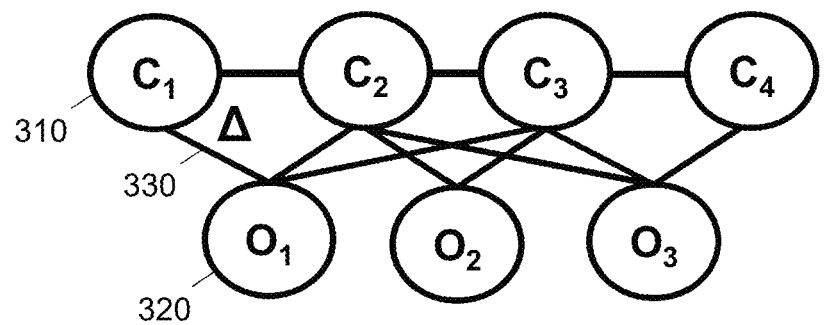
FIG. 3 is a schematic diagram showing an example pose graph.

FIG. 3 shows an example of a pose graph 300, such as may be represented within the data defining a pose graph 260 in FIG. 2. A pose graph is a graph whose nodes correspond to the poses of an object, which are for example time invariant in a static scene, or a camera at different points in time, and whose edges represent constraints between the poses. The constraints may be obtained from observations of the environment (e.g. from the video data) and/or from movement actions carried out by a robotic device within the environment (e.g. using odometry). A pose graph may be optimised by finding a spatial configuration of the nodes that is most consistent with the measurements modelled by the edges.

For ease of explanation, FIG. 3 shows a small example pose graph 300. It should be noted that an actual pose graph based on obtained data may be much more complex. The pose graph comprises nodes 310, 320 and edges 330 connecting those nodes. In the example of FIG. 3, each node has an associated transformation, representing a position and orientation of either a camera or an object, e.g. as detected by the system 200. For example, node 310 is associated with a first camera pose estimate $C_1$ and node 320 is associated with an object pose estimate for a first object $O_1$. Each edge 330 has constraints represented by $\Delta$ (delta) (although constraints associated with other edges than the edge 330 are omitted from FIG. 3, for clarity). An edge constraint may be determined based on Iterative Closest Point (ICP) error terms. These error terms may be defined by comparing successive camera pose estimates, and/or by comparing camera pose estimates and object pose estimates (e.g. as connected nodes in the pose graph). In this way, an ICP algorithm may be used to align an input frame with a current model of the set of objects in the scene (e.g. as stored in the pose graph). A final pose for each object in the scene may provide a measurement error for a current state of the pose graph, and optimisation of the pose graph may be used to minimise the measurement errors to provide an optimal current pose graph configuration. Measurement errors calculated in this way typically rely an inverse covariance, which may be approximated using a curvature, such as a Hessian curvature or Gauss-Newton curvature (sometimes referred to as JtJ), of the ICP cost function.

In certain cases, when the object recognition pipeline, such as 210 in FIG. 2, detects an object and provides a mask output containing data for that object, a new camera pose estimate is added as a node to the pose graph 300. Similarly, when a new object instance is initialised in the map of object instances, a new object pose estimate may be added as a node to the pose graph. An object pose estimate may be defined in relation to a coordinate frame attached to a volume centre for the 3D object volume. Object pose estimates may be considered as landmark nodes in the pose graph 300, e.g. pose estimates associated with "landmarks", i.e. useful objects to determine location and orientation. Each node 310, 320 in the pose graph may comprise a 6DOF transformation. For a camera pose estimate, this transformation may comprise a "camera-to-world" transformation—$T_{WC}$—and, for an object pose estimate, this may comprise a 6DOF "object-to-world" transformation—Two—where the "world" is represented by the model space. The transformation may comprise a rigid Special Euclidean group SE(3) transformation. In this case, the edges may comprise SE(3) relative pose constraints between nodes, which may be determined based on ICP error terms. In certain cases, the pose graph may be initialised with a fixed first camera pose estimate that is defined as the origin of the model space.

In operation, the fusion engine 220 may process the data defining the pose graph 260 in order to update camera and/or object pose estimates. For example, in one case, the fusion engine 220 may optimise the pose graph to reduce a total error for the graph calculated as a sum over all the edges from camera-to-object, and from camera-to-camera, pose estimate transitions based on the node and edge values. For example, a graph optimiser may model perturbations to local pose measurements, and use these to compute Jacobian terms for an information matrix used in the total error computation, e.g. together with an inverse measurement covariance based on an ICP error.

Figure 4:
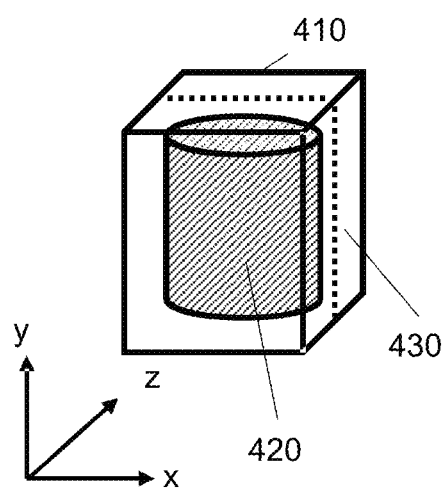
FIG. 4 is a schematic diagram showing use of a surface-distance metric according to an example.
Figure 4:
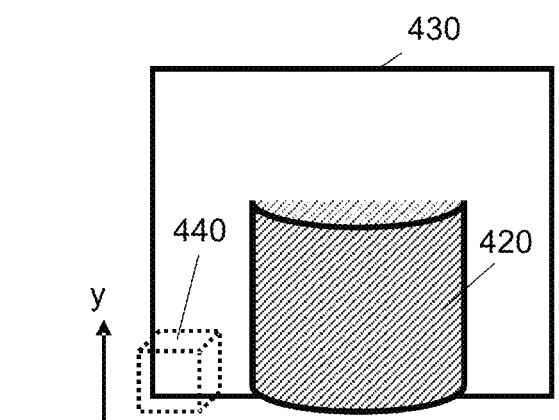

FIG. 4 shows an example 400 of a 3D object volume 410 for an object instance and an associated 2D slice through the volume indicating surface-distance metric values for a set of voxels associated with the slice.

As shown in FIG. 4, each object instance in the map of object instances has an associated 3D object volume 410. The voxel resolution, which is for example the number of voxels within the object volume 410, may be fixed at an initial value (e.g. 64×64×64). In such cases, the voxel size may depend on the object volume 410, which in turn depends on the object size. For example, for an object with a size of 1 metre cubed and a voxel resolution of 64×64×64, the voxels may be 0.0156 metres cubed in size. Similarly, for an object with a size of 2 metres cubed and the same voxel resolution of 64×64×64, the voxels may be 0.0313 metres cubed in size. In other words, smaller objects may be reconstructed with finer detail (e.g. using smaller voxels), than larger objects, which may be reconstructed more coarsely. The 3D object volume 410 is shown as a cubic volume, but volumes may vary and/or be non-regular shapes depending on configurations and/or objects being mapped.

In FIG. 4, an extent of an object 420 within the 3D object volume 410 is defined by surface-distance metric values associated with voxels of the volume. To illustrate these values a 2D slice 430 through the 3D object volume 410 is shown in the Figure. In this example, the 2D slice 430 runs through the centre of the object 420 and relates to a set of voxels 440 with a common z-space value. The x and y extent of the 2D slice 430 is shown in the upper right of the Figure. In the lower right, example surface-distance metric values 460 for the voxels are shown.

In the present case, the surface-distance metric indicates a distance from an observed surface in 3D space. In FIG. 4, the surface-distance metric indicates whether a voxel of the 3D object volume 410 belongs to free space outside of the object 420 or to filled space within the object 420. The surface-distance metric may comprise a normalised truncated signed distance function (TSDF) value. In FIG. 4, the surface-distance metric has values from 1 to −1. As such values for the slice 430 may be considered as a 2D image 450. Values of 1 represent free space outside of the object 420; whereas values of −1 represent filled space within the object 420. Values of 0 thus represent a surface of the object 420. Although only three different values ("1", "0", and "−1") are shown for ease of explanation, actual values may be decimal values (e.g. "0.54", or "−0.31") representing a relative distance to the surface. It should also be noted that whether negative or positive values represent a distance outside of a surface is a convention that may vary between implementations. The values may or may not be truncated depending on the implementation; truncation meaning that distances beyond a certain threshold are set to the floor or ceiling values of "1" and "−1". Similarly, normalisation may or may not be applied, and ranges other than "1" to "−1" may be used (e.g. values may be "−127 to 128" for 8-bit representation). In FIG. 4, the edges of the object 420 may be seen by the values of "0", and the interior of the object by values of "−1". In certain examples, as well as a surface-distance metric value, each voxel of the 3D object volume may also have an associated weight for use by the fusion engine 220. In certain cases, the weights may be set per frame (e.g. weights for an object from a previous frame are used to fuse depth data with the surface-distance metric values for a subsequent frame). The weights may be used to fuse depth data in a weighted average manner. One method of fusing depth data using surface-distance metric values and weight values is described in the paper "A Volumetric Method for Building Complex Models from Range Images" by Curless and Levoy as published in the Proceedings of SIGGRAPH '96, the 23$^{rd}$ annual conference on Computer Graphics and Interactive Techniques, A C M, 1996 (which is incorporated by reference where applicable). A further method involving fusing depth data using surface-distance metric values and weight values is described in the paper "KinectFusion: Real-Time Dense Surface Mapping and Tracking" by Newcombe et al as published in the Proceedings of the 24th annual ACM symposium on User Interface Software and Technology, A C M, 2011 (which is incorporated by reference where applicable).

Figure 5:
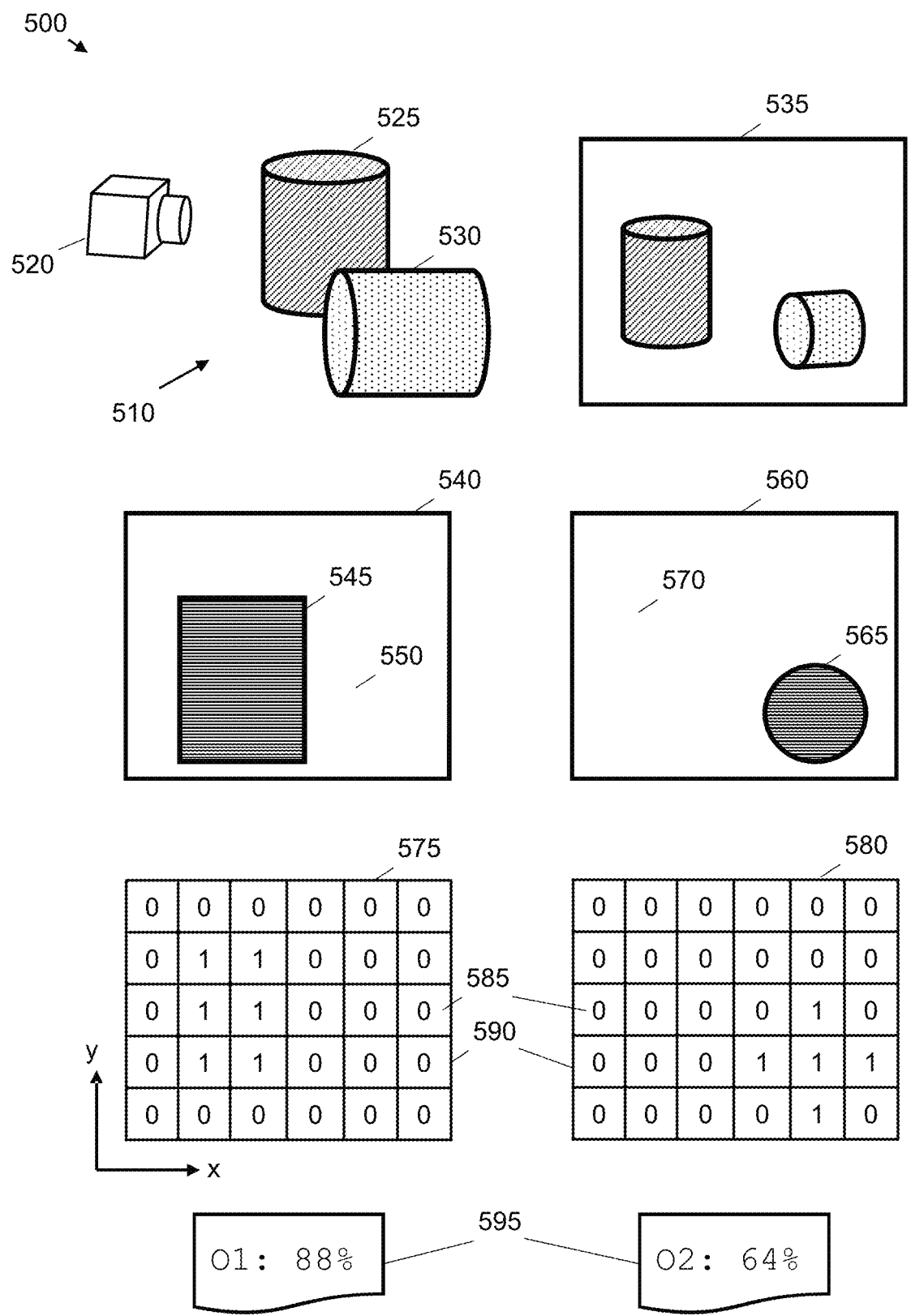
FIG. 5 is a schematic diagram showing an example mask output for an object recognition pipeline.

FIG. 5 shows an example 500 of mask output generated by an object recognition pipeline, such as the object recognition pipeline 210 in FIG. 2. At the top left of the Figure, there is an environment 510 containing two objects 525, 530. The environment 510 is observed by a video camera 520. At the top right of the Figure, an example frame of RGB video data 535 from the video camera 520 is shown. For example, this frame may be a 640 by 480 RGB image having 8-bit colour values for each colour channel. The frame 535 is provided as the input to the object recognition pipeline. The object recognition pipeline then processes the frame 535 to generate a mask output comprising mask images for each of a set of detected objects. In the present example, a first mask image 540 for the first object 525 is shown in the middle left of the Figure and a second mask image 560 for the second object 530 is shown in the middle right of the Figure. The mask images in the present case are binary mask images, e.g. pixels have one of two values. A simplified example of pixel values for the mask images 540 and 560 are shown as respective grids 575 and 580 at the bottom of the Figure. Pixel values 585 for pixels 590 are shown as 0 or 1 (e.g. as forming a binary mask image), but may be other values depending on the configuration of the object recognition pipeline. As can be seen, for mask image 540, which results from detection of object 525, pixel values are set to 1 for area 545 and 0 for area 550, where area 545 indicates an extent of the detected object. Similarly, for mask image 560, which results from detection of object 530, pixel values are set to 1 for area 565 and 0 for area 570, where area 565 indicates an extent of the detected object. The mask output from the object recognition pipeline may thus be seen as an output of image segmentation for detected objects.

The configuration of the mask output may vary depending on implementation. In one case, mask images are the same resolution as the input images (and e.g. may comprise grayscale images). In certain cases, additional data may also be output by the object recognition pipeline. In the example of FIG. 5, the object recognition pipeline is arranged to also output a confidence value 595 indicating a confidence or probability for the detected object. For example, FIG. 5 shows that the object recognition pipeline outputs an 88% probability of object 525 being present in the frame 535 but a 64% probability of object 530 being present in the frame 535. In examples, the object recognition pipeline may instead or additionally output a probability that a detected object is associated with a particular semantic class. For example, the object recognition pipeline may output an 88% probability of the object 525 being a "chair", a 10% probability of the object 525 being a "table" and a 2% probability of the object 525 being an "other" object type. This may be used to determine a class of a detected object. In some cases, a probability or confidence of an object being associated with a particular semantic class is compared against a threshold (such as a 50% confidence level) before accepting that an object has indeed been detected. A bounding box for the detected object may also be output (e.g. a definition of a 2D rectangle in image space), indicating an area that contains the detected object. In such cases, the mask output may be calculated within the bounding box.

In certain examples, the object recognition pipeline comprises a neural network, such as a convolutional neural network, that is trained on supervised (i.e. labelled) data. The supervised data may comprise pairs of images and segmentation masks for a set of objects. The convolutional neural network may be a so-called "deep" neural network, e.g. that comprises a plurality of layers. The object recognition pipeline may comprise a region-based convolutional neural network—RCNN—with a path for predicting image segmentation masks. An example configuration for an RCNN with a mask output is described by K. He et al. in the paper "Mask R-CNN", published in Proceedings of the International Conference on Computer Vision (ICCV), 2017 (1, 5)—(incorporated by reference where applicable). Different architectures may be used (in a "plug-in" manner) as they are developed. In certain cases, the objection recognition pipeline may output a mask image for segmentation independently from a class label probability vector. In this case, the class label probability vector may have an "other" label for objects that do not belong to a predefined class. These may then be flagged for manual annotation, e.g. to add to the list of available classes.

In certain cases, frames of video data (e.g. 240, 535) may be rescaled to a native resolution of the object recognition pipeline. Similarly, in certain cases, an output of the object recognition pipeline may also be rescaled to match a resolution of used by a fusion engine. As well as, or instead of, a neural network approach, the object recognition pipeline may implement at least one of a variety of machine learning methods, including: amongst others, support vector machines (SVMs), Bayesian networks, Random Forests, nearest neighbour clustering and the like. One or more graphics processing units may be used to train and/or implement the object recognition pipeline.

In one case, an object recognition pipeline receives frames of video data in the form of successive photometric (e.g. RGB) images, such as photometric data 185 in FIG. 1C. In certain examples, the object recognition pipeline may also be adapted to receive depth data as well as, or instead of, photometric data, e.g. depth images such as 180 in FIG. 1C. As such, the object recognition pipeline may comprise four input channels corresponding to each of RGB-D data.

An object recognition pipeline as described herein may be trained using one or more labelled datasets, i.e. frames of video data where object labels have been pre-assigned. For example, one such dataset comprises the NYU Depth Dataset V2 as discussed by N. Silberman et al. in Indoor Segmentation and Support Inference from RGBD Images published in ECCV 2012. The number of object or class labels may depend on the application.

In examples where the mask output comprises binary masks for a plurality of detected objects and respective confidence values (e.g. values such as 590 in FIG. 5), the mask output may be filtered before it is passed to a fusion engine for fusing with the depth data. In one case, the mask output may be filtered based on the confidence values, e.g. only mask images associated with the top k confidence values may be kept for subsequent processing and/or mask images with a confidence value below a predefined threshold may be discarded. In certain cases, filtering may be based on a plurality of mask images for an object, e.g. as detected over a predetermined number of frames of video data. In certain cases, filtering may exclude detections within a predefined number of pixels of an image edge or border.

Returning to FIG. 2, and having considered the example object instance 400 of FIG. 4 and the mask output 575, 580 shown in FIG. 5, during the fusing process, the fusion engine 220 in FIG. 2 may be configured to generate virtual or synthetic mask outputs for object instances within the map of object instances 270 using the camera pose estimates in the pose graph 260. For example, virtual mask images for a given frame of video data may be generated (i.e. rendered) using raycasting based on the object instances within the map of object instances 270 and a current camera pose estimate for the given frame, e.g. where the object instances are represented by surface-distance metric values within respective 3D object volumes as shown in FIG. 4. These generated virtual mask outputs may then be compared with the mask output 250 of the object recognition pipeline 210 to determine whether an existing object instance from the map of object instances 270 is detected in a frame of video data 240. In certain cases, the comparison comprises evaluating an intersection of a mask image in the mask output 250 of the object recognition pipeline 210 with virtual mask images for object instances in the map of object instances 270. A detection of an existing object may be based on the virtual mask image having a largest intersection. The comparison may also comprise comparing an intersection metric (e.g. based on an overlapping area in 2D image space) with a predefined threshold. For example, if a largest intersection has an intersection metric below the predefined threshold, the mask image from the object recognition pipeline may be deemed to be unassigned. Unassigned mask images may then trigger an object initialisation routine. As such, the fusion engine 220 may be configured to, in response to an absence of an existing object instance in the frame of video data, add a new object instance to the map of object instances 270 and a new node to the pose graph 260, the new node corresponding to an estimated object pose for the new object instance.

In certain cases, object label (i.e. class) probabilities within the mask output (e.g. confidence values 595 in FIG. 5) may be used, e.g. with or without the mask matching described above, to match objects detected by the objection recognition pipeline 210. For example, an object instance in the map of object instances may further comprise an object label probability distribution, which may be updated based on object label probability values output by the object recognition pipeline 210. The object label probability distribution may comprise a vector where each element is mapped to an object label or identifier (e.g. "cup" or "C1234") and stores a probability value. Hence, an object label determination may be made by sampling the probability distribution or taking the highest probability value. In one case, an object label probability distribution may be updated using Bayesian methods. In certain cases, the object label probability distribution may be determined by normalising and/or averaging per-pixel and/or per image object label probabilities output by the object recognition pipeline.

In certain cases, the fusion engine 220 may be further adapted to determine existence probabilities for respective object instances in the map of object instances. An existence probability may comprise a value between 0 and 1 (or 0% and 100%) that indicates a probability of the associated object existing in the surrounding environment. A Beta distribution may be used to model the existence probability, where parameters for the distribution are based on object detection counts. For example, an object instance may be projected to form a virtual mask image as described above, and detection counts may be based on pixel overlaps between the virtual mask image and mask images forming part of the mask output 250. When an existence probability is stored with an object instance, then this may be used to prune the map of object instances 270. For example, the existence probabilities of object instances may be monitored and, responsive to a determination that a value of the existence probability is less than a predefined threshold (e.g. 0.1), the associated object instance from the map of object instances may be removed. For example, the determination may comprise taking an expectation of the existence probability. Removing an object instance may comprise deleting the 3D object volume with the surface-distance metric values from the map of object instances 270 and removing nodes and edges of the pose graph associated with the pose estimate for the object.

Figure 6:
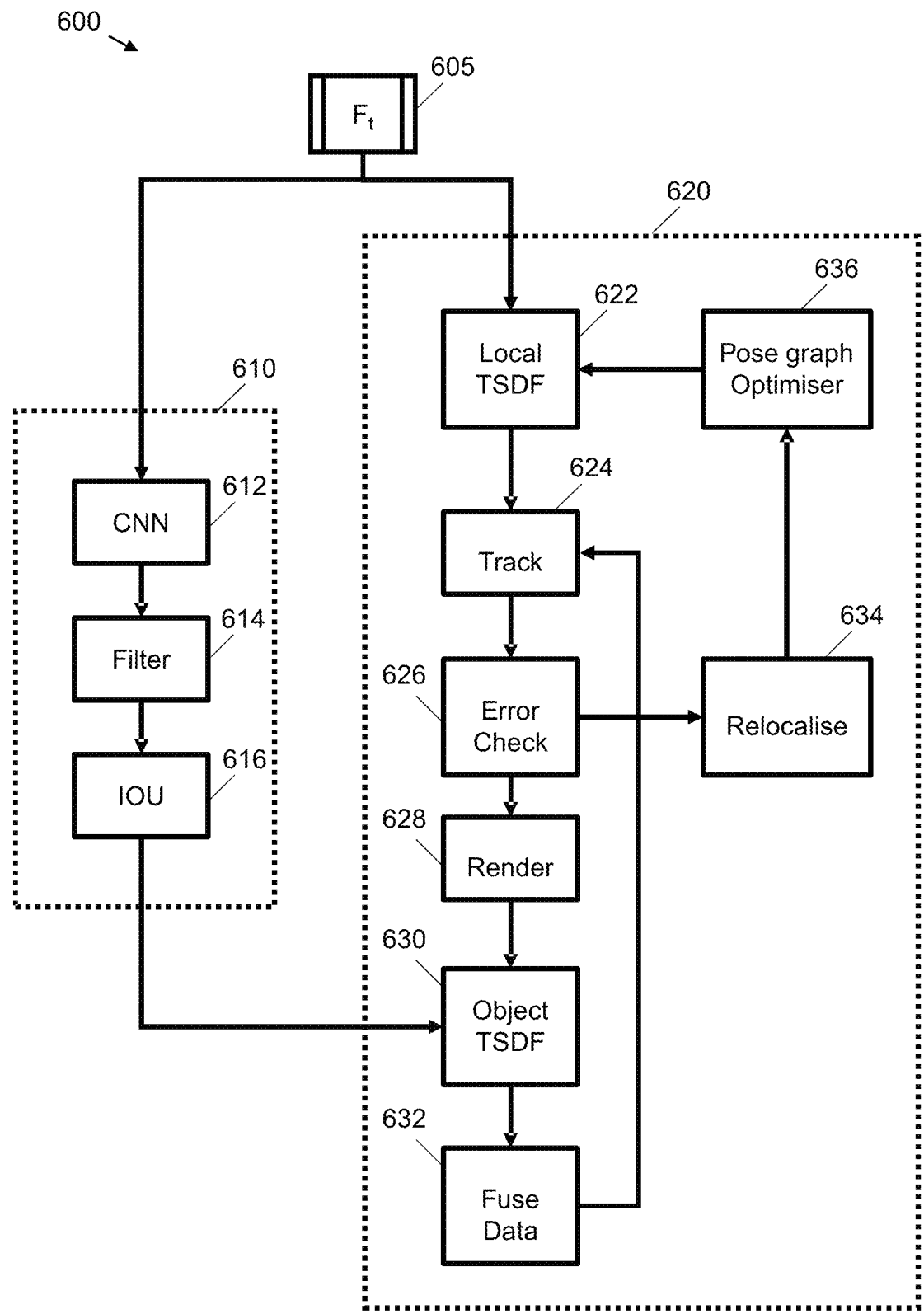
FIG. 6 is a schematic diagram showing components of a system for generating a map of object instances according to an example.

FIG. 6 shows another example of a system 600 for mapping objects in a surrounding or ambient environment using video data. The system 600 is shown operating on a frame $F_t$ of video data 605, where the components involved iteratively process a sequence of frames from the video data representing an observation or "capture" of the surrounding environment over time. The observation need not be continuous. As with the system 200 shown in FIG. 2, components of the system 600 may be implemented by computer program code that is processed by one or more processors, dedicated processing circuits (such as ASICs, FPGAs or specialised GPUs) and/or a combination of the two. The components of the system 600 may be implemented within a single computing device (e.g. a desktop, laptop, mobile and/or embedded computing device) or distributed over multiple discrete computing devices (e.g. certain components may be implemented by one or more server computing devices based on requests from one or more client computing devices made over a network).

The components of the system 600 shown in FIG. 6 are grouped into two processing pathways. A first processing pathway comprises an object recognition pipeline 610, which may be similar to the object recognition pipeline 210 of FIG. 2. A second processing pathway comprises a fusion engine 620, which may be similar to the fusion engine 220 of FIG. 2. It should be noted that certain components described with reference to FIG. 6, although described with reference to a particular one of the object recognition pipeline 610 and the fusion engine 620, may in certain implementations be provided as part of the other one of the object recognition pipeline 610 and the fusion engine 620, while maintaining the processing pathways shown in the Figure. It should also be noted that, depending on the implementation, certain components may be omitted or modified, and/or other components added, while maintaining a general operation as described in examples herein. The interconnections between components are also shown for ease of explanation and may again be modified, or additional communication pathways may exist, in actual implementations.

In FIG. 6, the object recognition pipeline 610 comprises a Convolutional Neural Network (CNN) 612, a filter 614, and an Intersection over Union (IOU) component 616. The CNN 612 may comprise a region-based CNN that generates a mask output (e.g. an implementation of Mask R-CNN) as described previously. The CNN 612 may be trained on one or more labelled image datasets. The filter 614 receives a mask output of the CNN 612, in the form of a set of mask images for respective detected objects and a set of corresponding object label probability distributions for the same set of detected objects. Each detected object thus has a mask image and an object label probability. The mask images may comprise binary mask images. The filter 614 may be used to filter the mask output of the CNN 612, e.g. based on one or more object detection metrics such as object label probability, proximity to image borders, and object size within the mask (e.g. areas below X $pixels^2$ may be filtered out). The filter 614 may act to reduce the mask output to a subset of mask images (e.g. 0 to 100 mask images) that aids real-time operation and memory demands. The output of the filter 614, comprising a filtered mask output, is then received by the IOU component 616. The IOU component 616 accesses rendered or "virtual" mask images that are generated based on any existing object instances in a map of object instances. The map of object instances is generated by the fusion engine 620 as described below. The rendered mask images may be generated by raycasting using the object instances, e.g. using surface-distance metric values stored within respective 3D object volumes. The rendered mask images may be generated for each object instance in the map of object instances, and may comprise binary masks to match the mask output from the filter 614. The IOU component 616 may calculate an intersection of each mask image from the filter 614, with each of the rendered mask images for the object instances. The rendered mask image with largest intersection may be selected as an object "match", with that rendered mask image then being associated with the corresponding object instance in the map of object instances. The largest intersection computed by the IOU component 616 may be compared with a predefined threshold. If the largest intersection is larger than the threshold, the IOU component 616 outputs the mask image from the CNN 612 and the association with the object instance; if the largest intersection is below the threshold, then the IOU component 616 outputs an indication that no existing object instance is detected. The output of the IOU component 616 is then passed to the fusion engine 620. It should be noted that even though the IOU component 616 forms part of the object recognition pipeline 610 in FIG. 6, e.g. because it operates on 2D images on a timing based on the CNN 612, in other implementations it may alternatively form part of the fusion engine 620.

In the example of FIG. 6, the fusion engine 620 comprises a local TSDF component 622, a tracking component 624, an error checker 626, a renderer 628, an object TSDF component 630, a data fusion component 632, a relocalisation component 634 and a pose graph optimiser 636. Although not shown in FIG. 6 for clarity, in use, the fusion engine 620 operates on a pose graph and a map of object instances, e.g. in a similar manner to the fusion engine 220 of FIG. 2. In certain cases, a single representation may be stored, where the map of object instances is formed by the pose graph, and 3D object volumes associated with object instances are stored as part of the pose graph node (e.g. as data associated with the node). In other cases, separate representations may be stored for the pose graph and the set of object instances. As discussed herein, the term "map" may refer to a collection of data definitions for object instances, where those data definitions include location and/or orientation information for respective object instances, e.g. such that a position and/or orientation of an object instance with respect to an observed environment may be recorded.

In the example of FIG. 6, the surface-distance metric values associated with object instances are TSDF values. In other examples, other metric values may be used. In this example, as well as a map of object instances storing these values, an object-agnostic model of the surrounding environment is also used. This is generated and updated by the local TSDF component 622. The object-agnostic model provides a 'coarse' or low-resolution model of the environment that enables tracking to be performed in the absence of detected objects. The local TSDF component 622, and the object-agnostic model, may be useful for implementations that are to observe an environment with sparsely located objects. It may not be used for environments with dense distributions of objects. As discussed with reference to the system 200 of FIG. 2, data defining the object-agnostic model may be stored in a memory accessible to the fusion engine 620, e.g. as well as the pose graph and the map of object instances.

In the example of FIG. 6, the local TSDF component 622 receives frames of video data 605 and generates an object-agnostic model of the surrounding (3D) environment to provide frame-to-model tracking responsive to an absence of detected object instances. For example, the object-agnostic model may comprise a 3D volume, similar to the 3D object volumes, that stores surface-distance metric values representing a distance to a surface as formed in the environment. In the present example, the surface-distance metric values comprise TSDF values. The object-agnostic model does not segment the environment into discrete object instances; it may be considered an 'object instance' that represents the whole environment. The object-agnostic model may be coarse or low resolution in the fact that a limited number of voxels of a relatively large size may be used to represent the environment. For example, in one case, a 3D volume for the object-agnostic model may have a resolution of 256×256× 256, wherein a voxel within the volume represents approximately a 2 cm cube in the environment. Similar to the fusion engine 220 in FIG. 2, the local TSDF component 622 may determine a volume size and a volume centre for the 3D volume for the object-agnostic model. The local TSDF component 622 may update the volume size and the volume centre upon receipt of further frames of video data, e.g. to account for an updated camera pose if the camera has moved.

In the example 600 of FIG. 6, the object-agnostic model and the map of object instances is provided to the tracking component 624. The tracking component 624 is configured to track an error between at least one of image and depth data associated with the frames of video data 605 and one or more of the object-instance-agnostic model and the map of object instances. In one case, layered reference data may be generated by raycasting from the object-agnostic model and the object instances. The reference data may be layered in that data generated based on each of the object-agnostic model and the object instances (e.g. based on each object instance) may be accessed independently, in a similar manner to layers in image editing applications. The reference data may comprise one or more of a vertex map, a normal map, and an instance map, where each "map" may be in the form of a 2D image that is formed based on a recent camera pose estimate (e.g. a previous camera pose estimate in the pose graph), where the vertices and normals of the respective maps are defined in model space, e.g. with reference to a world frame. Vertex and normal values may be represented as pixel values in these maps. The tracking component 624 may then determine a transformation that maps from the reference data to data derived from a current frame of video data 605 (e.g. a so-called "live" frame). For example, a current depth map for time t may be projected to a vertex map and a normal map and compared to the reference vertex and normal maps. Bilateral filtering may be applied to the depth map in certain cases. The tracking component 624 may align data associated with the current frame of video data with reference data using an iterative closest point (ICP) function. The tracking component 624 may use the comparison of data associated with the current frame of video data with reference data derived from at least one of the object-agnostic model and the map of object instances to determine a camera pose estimate for the current frame (e.g. $T_{WC}^{t+1}$). This may be performed for example before recalculation of the object-agnostic model (for example before relocalisation). The optimised ICP pose (and invariance covariance estimate) may be used as a measurement constraint between camera poses, which are each for example associated with a respective node of the pose graph. The comparison may be performed on a pixel-by-pixel basis. However, to avoid overweighting pixels belonging to object instances, e.g. to avoid double counting, pixels that have already been used to derive object-camera constraints may be omitted from optimisation of the measurement constraint between camera poses.

The tracking component 624 outputs a set of error metrics that are received by the error checker 626. These error metrics may comprise a root-mean-square-error (RMSE) metric from an ICP function and/or a proportion of validly tracked pixels. The error checker 626 compares the set of error metrics to a set of predefined thresholds to determine if tracking is maintained or whether relocalisation is to be performed. If relocalisation is to be performed, e.g. if the error metrics exceed the predefined thresholds, then the error checker 626 triggers the operation of the relocalisation component 634. The relocalisation component 634 acts to align the map of object instances with data from the current frame of video data. The relocalisation component 634 may use one of a variety of relocalisation methods. In one method, image features may be projected to model space using a current depth map, and random sample consensus (RANSAC) may be applied using the image features and the map of object instances. In this way, 3D points generated from current frame image features may be compared with 3D points derived from object instances ion the map of object instances (e.g. transformed from the object volumes). For example, for each instance in a current frame which closely matches a class distribution of an object instance in the map of object instances (e.g. with a dot product of greater than 0.6) 3D-3D RANSAC may be performed. If a number of inlier features exceeds a predetermined threshold, e.g. 5 inlier features within a 2 cm radius, an object instance in the current frame may be considered to match an object instance in the map. If a number of matching object instances meets or exceeds a threshold, e.g. 3, 3D-3D RANSAC may be performed again on all of the points (including points in the background) with a minimum of 50 inlier features within a 5 cm radius, to generate a revised camera pose estimate. The relocalisation component 634 is configured to output the revised camera pose estimate. This revised camera pose estimate is then used by the pose graph optimiser 636 to optimise the pose graph.

The pose graph optimiser 636 is configured to optimise the pose graph to update camera and/or object pose estimates. This may be performed as described above. For example, in one case, the pose graph optimiser 636 may optimise the pose graph to reduce a total error for the graph calculated as a sum over all the edges from camera-to-object, and from camera-to-camera, pose estimate transitions based on the node and edge values. For example, a graph optimiser may model perturbations to local pose measurements, and use these to compute Jacobian terms for an information matrix used in the total error computation, e.g. together with an inverse measurement covariance based on an ICP error. Depending on a configuration of the system 600, the pose graph optimiser 636 may or may not be configured to perform an optimisation when a node is added to the pose graph. For example, performing optimisation based on a set of error metrics may reduce processing demands as optimisation need not be performed each time a node is added to the pose graph. Errors in the pose graph optimisation may not be independent of errors in tracking, which may be obtained by the tracking component 624. For example, errors in the pose graph caused by changes in a pose configuration may be the same as a point-to-plane error metric in ICP given a full input depth image. However, recalculation of this error based on a new camera pose typically involves use of the full depth image measurement and re-rendering of the object model, which may be computationally costly. To reduce a computational cost, a linear approximation to the ICP error produced using the Hessian of the ICP error function may instead be used as a constraint in the pose graph during optimisation of the pose graph.

Returning to the processing pathway from the error checker 626, if the error metrics are within acceptable bounds (e.g. during operation or following relocalisation), the renderer 628 operates to generate rendered data for use by the other components of the fusion engine 620. The renderer 628 may be configured to render one or more of depth maps (i.e. depth data in the form of an image), vertex maps, normal maps, photometric (e.g. RGB) images, mask images and object indices. Each object instance in the map of object instances for example has an object index associated with it. For example, if there are n object instances in the map, the object instances may be labelled from 1 to n (where n is an integer). The renderer 628 may operate on one or more of the object-agnostic model and the object instances in the map of object instances. The renderer 628 may generate data in the form of 2D images or pixel maps.

As described previously, the renderer 628 may use raycasting and the surface-distance metric values in the 3D object volumes to generate the rendered data. Raycasting may comprise using a camera pose estimate and the 3D object volume to step along projected rays within a given stepsize and to search for a zero-crossing point as defined by the surface-distance metric values in the 3D object volume. Rendering may be dependent on a probability that a voxel belongs to a foreground or a background of a scene. For a given object instance, the renderer 628 may store a ray length of a nearest intersection with a zero-crossing point, and may not search past this ray length for subsequent object instances. In this manner occluding surfaces may be correctly rendered. If a value for an existence probability is set based on foreground and background detection counts, then the check against the existence probability may improve the rendering of overlapping objects in an environment.

The renderer 628 outputs data that is then accessed by the object TSDF component 630. The object TSDF component 630 is configured to initialise and update the map of object instances using the output of the renderer 628 and the IOU component 616. For example, if the IOU component 616 outputs a signal indicating that a mask image received from the filter 614 matches an existing object instance, e.g. based on an intersection as described above, then the object TSDF component 630 retrieves the relevant object instance, e.g. a 3D object volume storing surface-distance metric values, which are TSDF values in the present example. The mask image and the object instance are then passed to the data fusion component 632. This may be repeated for a set of mask images forming the filtered mask output, e.g. as received from the filter 614. As such, the data fusion component 632 may receive at least an indication or address of a set of mask images and a set of corresponding object instances. In certain cases, the data fusion component 632 may also receive or access a set of object label probabilities associated with the set of mask images. Integration at the data fusion component 632 may comprise, for a given object instance indicated by the object TSDF component 630, and for a defined voxel of a 3D object volume for the given object instance, projecting the voxel into a camera frame pixel, i.e. using a recent camera pose estimate, and comparing the projected value with a received depth map for the frame of video data 605. In certain cases, if the voxel projects into a camera frame pixel with a depth value (i.e. a projected "virtual" depth value based on a projected TSDF value for the voxel) that is less than a depth measurement (e.g. from a depth map or image received from an RGB-D capture device) plus a truncation distance, then the depth measurement may be fused into the 3D object volume. In certain cases, as well as a TSDF value, each voxel also has an associated weight. In these cases, fusion may be applied in a weighted average manner.

In certain cases, this integration may be performed selectively. For example, integration may be performed based on one or more conditions, such as when error metrics from the tracking component 624 are below predefined thresholds. This may be indicated by the error checker 626. Integration may also be performed with reference to frames of video data where the object instance is deemed to be visible. These conditions may help to maintain the reconstruction quality of object instances in a case that a camera frame drifts.

In certain cases, the integration performed by the data fusion component 632 may be performed throughout the 3D object volume of the object instance, e.g. regardless of whether a particular portion of the 3D object volume matches, when projected as a mask image, the output of the object recognition pipeline 610. In certain cases, a determination may be made as to whether portions of the 3D object volume for an object instance form part of a foreground (e.g. as opposed to not being part of a foreground or being part of a background). For example, a foreground probability may be stored for each voxel of the 3D object volume based on detection or matches between pixels from a mask image from the mask output and pixels from a projected image. In one case, detection counts for "foreground" and "not foreground" are modelled as a beta distribution (e.g. as $(\alpha, \beta)$ shape parameters), initialised with (1, 1). When the IOU component 616 indicates a match or detection that relates to an object instance, the data fusion component 632 may be configured to update the "foreground" and "not foreground" detection counts for a voxel based on a comparison between a pixel for a corresponding mask image from the mask output and a pixel from a projected mask image (e.g. as output by the renderer 628), e.g. a "foreground" count is updated if both pixels have a positive value indicating fill in the mask images and the "not foreground" count is updated if one of the pixels has a zero value indicating absence of an object in the images. These detection counts may be used to determine an expectation (i.e. a probability or confidence value) that a particular voxel forms part of the foreground. This expectation may be compared to a predefined threshold (e.g. 0.5) to output a discrete decision regarding a foreground status (e.g. indicating whether or not the voxel is determined to be part of the foreground). In some cases, 3D object volumes for different object instances may at least partially overlap each other. Hence, the same surface element may be associated with a plurality of different voxels (each associated with different respective 3D object volumes), but may be "foreground" in some of the voxels and "not foreground" in others. Once data is fused by the data fusion component 632, an updated map of object instances is available to the fusion engine 620 (e.g. with updated TSDF values in the respective 3D object volumes). This updated map of object instances may then be accessed by the tracking component 624 to be used in frame-to-model tracking.

The system 600 of FIG. 6 may operate iteratively on frames of video data 605 to build a robust map of object instances over time, together with a pose graph indicating object poses and camera poses. The map of object instances and the pose graph may then be made available to other devices and systems to allow navigation and/or interaction with the mapped environment. For example, a command from a user (e.g. "bring me the cup") may be matched with an object instance within the map of object instances (e.g. based on an object label probability distribution or 3D shape matching), and the object instance and object pose may be used by a robotic device to control actuators to extract the corresponding object from the environment. Similarly, the map of object instances may be used to document objects within the environment, e.g. to provide an accurate 3D model inventory. In augmented reality applications, object instances and object poses, together with real-time camera poses, may be used to accurately augment an object in a virtual space based on a real-time video feed.

The system 600 shown in FIG. 6 may be applied to a RGB-D input. In this system 600, components such as the local TSDF component 622, the tracking component 624, and the error checker 626 in the fusion engine 620 allow a coarse background TSDF model to be initialised for local tracking and occlusion handling. If a pose changes sufficiently or the system appears lost, relocalisation may be performed by the relocalisation component 634 and graph optimisation may be performed by the pose graph optimiser 636. Relocalisation and graph optimisation may be performed to arrive at a new camera location (e.g. a new camera pose estimate), and the coarse TSDF model managed by the local TSDF component 622 may be reset. While this is happening, the object recognition pipeline 610 may be implemented as a separate thread or parallel process. RGB frames may be processed by the CNN component 612, and the detections filtered by the filter 614 and matched to the existing map of object instances managed by the object TSDF component 630 by way of the IOU component 616. When no match occurs, new TSDF object instances are created by the object TSDF component 630, sized, and added to the map for local tracking, global pose graph optimisation, and relocalisation. On future frames, associated detections may then be fused into object instance alongside object label and existence probabilities.

Certain examples described herein thus enable a RGB-D camera to browse or observe a cluttered indoor scene and provide object segmentations, wherein the object segmentations are used to initialise compact per-object surface-distance metric reconstructions, which may have an object-size-dependent resolution. Examples may be adapted such that each object instance also has an associated object label (e.g. "semantic") probability distribution over classes which is refined over time, and an existence probability to account for spurious object instance predictions.

Implementations of certain examples described herein have been tested on a hand-held RGB-D sequence from a cluttered office scene with a large number and variety of object instances. These tests, for example, used a ResNet base model for a CNN component in the object recognition pipeline that was finetuned on an indoor scene dataset. In this environment, these implementations were able to close loops based on multiple object alignment and make good use of existing objects on repeated loops (e.g. where "loops" represent circular or near-circular observation paths in the environment). These implementations were thus shown to successfully and robustly map existing objects, providing an improvement when compared to certain comparative approaches. In these implementations, a trajectory error was seen to be consistently above against a baseline approach, such as a RGB-D SLAM benchmark. Also, good, high-quality object reconstructions were observed when 3D renderings of object instances in the map of object instances were compared with public ground-truth models. Implementations were seen to be highly memory efficient and suitable for online, real-time use. In certain configurations, it was seen that memory usage scaled cubically with the size of a 3D object volume, and hence memory efficiencies were obtained when a map of object instances was composed with many relatively small, highly detailed, volumes in dense areas of interest, as opposed to a single large volume for the environment that a resolution suited for the smallest object.

Figure 7:
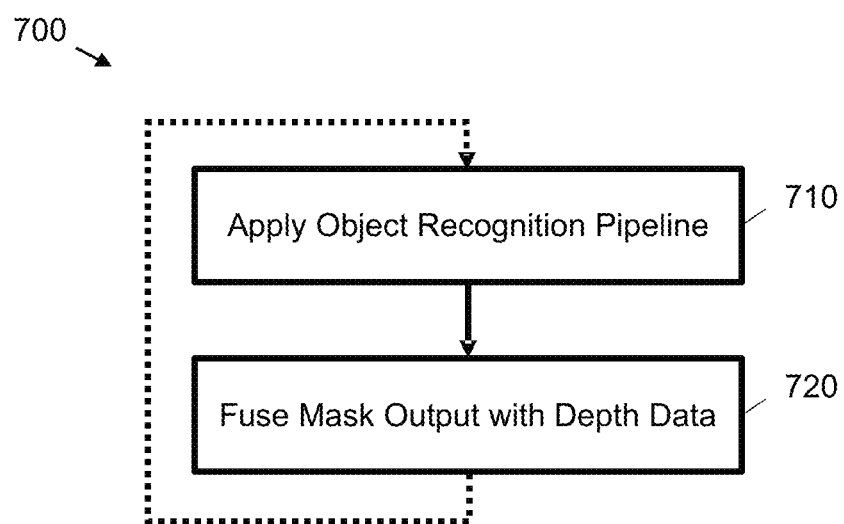
FIG. 7 is a flow diagram showing an example process for generating a map of object instances according to an example.

FIG. 7 shows a method 700 for mapping object instances according to an example. In FIG. 7, the method 700 comprises a first operation 710 of applying an object recognition pipeline to frames of video data. The object recognition pipeline may be a pipeline 210 or 610 as respectively shown in FIGS. 2 and 6. Applying the object recognition pipeline results in a mask output of objects detected in the frames of video data. For example, the object recognition pipeline may be applied to every frame in a sequence of frames or to a sampled subset of frames (e.g. every X frames). The mask output may comprise a set of 2D mask images for detected objects. The object recognition pipeline may be trained on labelled image data. In a second operation 720, the mask output of the object recognition pipeline is fused with depth data associated with the frames of video data to generate a map of object instances. The map of object instances may comprise a set of 3D object volumes for respective objects detected within the environment. These 3D object volumes may comprise volume elements (e.g. voxels) that have associated surface-distance metric values, such as TSDF values. An object pose estimate may be defined for each object instance that indicates how the 3D object volume may be mapped to a model space for the environment, e.g. from a local coordinate system for the object (an "object frame") to a global coordinate system for the environment (a "world frame"). This mapping may be by way of an object pose estimate, e.g. an indication of a position and orientation of the object in the environment. This may be defined by way of a transformation, such as a 6DOF transformation. Fusion may involve including projecting the mask output to the model space for the map of object instances using a camera pose estimate and the depth data. For example, this may comprise rendering a "virtual" mask image based on a 3D object volume and the camera pose estimate, and comparing this to one or more mask images from the mask output. In the method 700, the object pose estimate and the camera pose estimate form nodes of a pose graph for the map of model instances. This enables the pose graph to be consistent with regard to both camera movement and object position and orientation.

In certain cases, fusing the mask output of the object recognition pipeline with depth data associated with the frames of video data comprises: estimating mask outputs for object instances using the camera pose estimate and comparing the estimated mask outputs with the mask output of the object recognition pipeline to determine whether an object instance from the map of object instances is detected in a frame of the video data. For example, this is described with reference to the IOU component 616 above. In response to an absence of an existing object instance in the frame of video data, e.g. if no match is found for a particular mask image in the mask output, a new object instance may be added to the map of object instances and a new object pose estimate may be added to the pose graph. This may form a landmark node in the pose graph. Responsive to a detected object instance, surface-distance metric values for an object instance may be updated based on at least one of image and depth data associated with the frame of video data.

In certain cases, an object instance may comprise data defining one or more of a foreground probability, an existence probability and an object label probability. These probabilities may be defined as probability distributions that are then evaluated to determine a probability value (e.g. by sampling or taking an expectation). In these cases, the method 700 may comprise determining, probabilistically, whether portions of the three-dimensional object volume for an object instance form part of a foreground, and/or determining an existence probability for an object instance in the map of object instances. In the latter case, responsive to determining that a value of the existence probability is less than a predefined threshold, an object instance may be removed from the map of object instances.

In certain cases, e.g. as described above, the mask output comprises binary masks for a plurality of detected objects. The mask output may also comprise confidence values. In these cases, the method may comprise filtering the mask output of the object recognition pipeline based on the confidence values before fusing the mask output.

In certain cases, an object-agnostic model of a three-dimensional environment containing the objects may be computed. For example, this is explained with reference to at least the local TSDF component 622 described above. In this case, the object-agnostic model of the three-dimensional environment may be used to provide frame-to-model tracking in the absence of detected objects being present in a frame or scene, e.g. in cases where object pose estimates are not able to be used for tracking and/or cases with sparsely distributed objects. An error may be tracked between at least one of image and depth data associated with the frames of video data and the object-agnostic model, e.g. as explained with reference to at least the error checker 626. Responsive to an error exceeding a predefined threshold, relocalisation may be performed, e.g. as explained with reference to at least the relocalisation component 634. This enables a current frame of the video data to be aligned to at least the map of object instances. This may comprise optimising the pose graph, e.g. as explained with reference to at least the pose graph optimiser 636.

Certain examples described herein provide a generic object-oriented SLAM system which performs mapping using 3D object instance reconstruction. In certain cases, per-frame object instance detections may be robustly fused using, e.g. voxel foreground masks, and missing detections may be accounted for using an "existence" probability. The map of object instances and associated pose graph allow high-quality object reconstruction with globally consistent loop-closed object-based SLAM maps.

Unlike many comparative dense reconstruction systems (e.g. that use a high-resolution point cloud to represent an environment and the objects therein), certain examples described herein do not require maintenance of a dense representation of an entire scene. In current examples, a persistent map may be constructed from reconstructed object instances on their own. Certain examples described herein combine the use of rigid surface-distance metric volumes for high-quality object reconstructions with the flexibility of a pose-graph system without the complication of performing intra-object-volume deformations. In certain examples, each object is represented within a separate volume, allowing each object instance to have a different, suitable, resolution with larger objects integrated into lower fidelity surface-distance metric volumes than their smaller counterparts. It also enables tracking large scenes with relatively small memory usage and high-fidelity reconstructions by excluding large volumes of free-space. In certain cases, a "throw-away" local model of the environment having an unidentified structure may be used to assist tracking and model occlusions. Certain examples enable semantically labelled object reconstructions without strong a priori knowledge of the object types present in a scene. In certain examples, the quality of object reconstructions is optimised and residual errors are absorbed in the edges of the pose graph. The object-centric maps of certain examples group together geometric elements that make up an object as "instances", which may be labelled and processed as "units", e.g. in contrast to approaches that independently label dense geometry such as points in 3D space or surfels. Such an approach facilitates machine-environment interactions and dynamic object reasoning, e.g. in indoor environments.

Examples described herein do not require a full set of object instances, including their detailed geometric shapes, to be known or provided beforehand. Certain examples described herein leverage developments in 2D image classification and segmentation and adapt them for 3D scene exploration without a need for pre-populated databases of known 3D objects or complex 3D segmentation. Certain examples are designed for online use and do not require changes to occur in an observed environment to map or discover objects. In certain examples described herein, discovered object instances are tightly integrated into the SLAM system itself, and detected objects are fused into separate object volumes using mask image comparisons (e.g. by comparing a foreground "virtual" image generated by projecting from a 3D object volume to mask images output by the object recognition pipeline). Separating the 3D object volumes enables object-centric pose graph optimisation, which is not possible with a shared 3D volume for object definitions. Certain examples described herein also do not require full semantic 3D object recognition (e.g. knowing what 3D object is present in a scene) but operate probabilistically on 2D image segmentations.

Examples of functional components as described herein with reference to FIGS. 2 and 6 may comprise dedicated processing electronics and/or may be implemented by way of computer program code executed by a processor of at least one computing device. In certain cases, one or more embedded computing devices may be used. Components as described herein may comprise at least one processor operating in association with memory to execute computer program code loaded onto a computer readable medium. This medium may comprise solid state storage such as an erasable programmable read only memory and the computer program code may comprise firmware. In other cases, the components may comprise a suitably configured system-on-chip, application-specific integrated circuit and/or one or more suitably programmed field-programmable gate arrays. In one case, the components may be implemented by way of computer program code and/or dedicated processing electronics in a mobile computing device and/or a desktop computing device. In one case, the components may be implemented, as well as or instead of the previous cases, by one or more graphical processing units executing computer program code. In certain cases, the components may be implemented by way of one or more functions implemented in parallel, e.g. on multiple processors and/or cores of a graphics processing unit.

In certain cases, the apparatus, systems or methods described above may be implemented with or for robotic devices. In these cases, the map of object instances may be used by the device to interact with and/or navigate a three-dimensional space. For example, a robotic device may comprise a capture device, a system as shown in FIG. 2 or 6, a data storage device configured to store a map of object instances and a pose graph, an interaction engine and one or more actuators. The one or more actuators may enable the robotic device to interact with a surrounding three-dimensional environment. In one case, the robotic device may be configured to capture video data as the robotic device navigates a particular environment (e.g. as per device 130 in FIG. 1A). In another case, the robotic device may scan an environment, or operate on video data received from a third party, such as a user with a mobile device or another robotic device. As the robotic device processes the video data, it may be arranged to generate a map of object instances and/or a pose graph as described herein and store this in the data storage device. The interaction engine may then be configured to access the generated data to control the one or more actuators to interact with the environment. In one case, the robotic device may be arranged to perform one or more functions. For example, the robotic device may be arranged to perform a mapping function, locate particular persons and/or objects (e.g. in an emergency), transport objects, perform cleaning or maintenance etc. To perform one or more functions the robotic device may comprise additional components, such as further sensory devices, vacuum systems and/or actuators to interact with the environment. These functions may then be applied based on the object instances. For example, a domestic robot may be configured to apply one set of functions using a 3D model of a "plant pot" object instance and another set of functions using a 3D model of a "washing machine" object instance.

The above examples are to be understood as illustrative. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method, comprising:
applying an object recognition pipeline to frames of video data, the object recognition pipeline providing a mask output of objects detected in the frames, the mask output comprising a plurality of images, each image in the plurality of images being associated with a respective different object detected by the object recognition pipeline and indicating pixels occupied by that object within a given frame of the video data, pixels in each image of the mask output having values indicative of whether corresponding pixels of the given frame are occupied by the respective different object; and
fusing the mask output of the object recognition pipeline with depth data associated with the frames of video data to generate a map of object instances,
including projecting, using a camera pose estimate and the depth data, the indicated pixels of a given image of the mask output to a model space for the map of object instances, thereby to determine points in the model space associated with an object instance in the map of object instances,
wherein the object instance in the map of object instances is defined using surface-distance metric values within a three-dimensional object volume, and has an object pose estimate indicating a transformation of the object instance to the model space,
wherein the object pose estimate and the camera pose estimate form nodes of a pose graph for the map of model instances.

2. The method of claim 1, wherein fusing the mask output of the object recognition pipeline with depth data associated with the frames of video data comprises:
estimating mask outputs for object instances using the camera pose estimate; and
comparing the estimated mask outputs with the mask output of the object recognition pipeline to determine whether an object instance from the map of object instances is detected in a frame of the video data.

3. The method of claim 2, wherein, in response to an absence of an existing object instance in the frame of video data, fusing the mask output of the object recognition pipeline with depth data associated with the frames of video data comprises:
adding a new object instance to the map of object instances; and
adding a new object pose estimate to the pose graph.

4. The method of claim 2, wherein fusing the mask output of the object recognition pipeline with depth data associated with the frames of video data comprises:

responsive to a detected object instance, updating the surface-distance metric values based on at least one of image and depth data associated with the frame of video data.

5. The method of claim 1, wherein the three-dimensional object volume comprises a set of voxels, wherein different object instances have different voxel resolutions within the map of object instances.

6. The method of claim 1, where the surface-distance metric values are truncated signed distance function (TSDF) values.

7. The method of claim 1, comprising:
determining, probabilistically, whether portions of the three-dimensional object volume for an object instance form part of a foreground.

8. The method of claim 1, comprising:
determining an existence probability for an object instance in the map of object instances; and
responsive to determining that a value of the existence probability is less than a predefined threshold, removing the object instance from the map of object instances.

9. The method of claim 1, wherein the mask output comprises binary masks for a plurality of detected objects and respective confidence values, the method comprising:
filtering the mask output of the object recognition pipeline based on the confidence values before fusing the mask output.

10. The method of claim 1, comprising:
computing an object-agnostic model of a three-dimensional environment containing the objects; and
responsive to an absence of detected objects, using the object-agnostic model of the three-dimensional environment to provide frame-to-model tracking.

11. The method of claim 10, comprising:
tracking an error between at least one of image and depth data associated with the frames of video data and the object-agnostic model; and
responsive to the error exceeding a predefined threshold, performing relocalisation to align a current frame of the video data to the map of object instances, including optimising the pose graph.

12. A system, comprising:
an object recognition pipeline comprising at least one processor to detect objects in frames of video data and to provide a mask output of objects detected in the frames, the mask output comprising a plurality of images, each image in the plurality of images being associated with a respective different object detected by the object recognition pipeline and indicating pixels occupied by that object within a given frame of the video data, pixels in each image of the mask output having values indicative of whether corresponding pixels of the given frame are occupied by the respective different object;
memory storing data defining a map of object instances, an object instance in the map of object instances being defined using surface-distance metric values within a three-dimensional object volume;
memory storing data defining a pose graph for the map of object instances, the pose graph comprising nodes indicating camera pose estimates and object pose estimates, the object pose estimates indicating a position and orientation of the object instance in a model space; and a fusion engine comprising at least one processor to fuse the mask output of the object recognition pipeline with depth data associated with the frames of video data to populate the map of object instances, the fusion engine being configured to project, using a camera pose estimate and the depth data, the indicated pixels of a given image of the mask output to the model space for the map of object instances using nodes of the pose graph, thereby to determine points in the model space associated with an object instance in the map of object instances.

13. The system of claim 12, wherein the fusion engine is configured to generate mask outputs for object instances within the map of object instances using the camera pose estimates, and to compare the generated mask outputs with the mask output of the object recognition pipeline to determine whether an object instance from the map of object instances is detected in a frame of video data.

14. The system of claim 12, wherein the fusion engine is configured to, in response to an absence of an existing object instance in the frame of video data, add a new object instance to the map of object instances and a new node to the pose graph, the new node corresponding to an estimated object pose for the new object instance.

15. The system of claim 12, comprising:
memory storing data indicative of an object-agnostic model of a three-dimensional environment containing the objects; and
wherein the fusion engine is to use the object-agnostic model of the three-dimensional environment to provide frame-to-model tracking responsive to an absence of detected object instances.

16. The system of claim 15, comprising:
a tracking component comprising at least one processor to track an error between at least one of image and depth data associated with the frames of video data and the object-agnostic model,
wherein, responsive to the error exceeding a predefined threshold, the model tracking engine is to optimise the pose graph.

17. The system of claim 12, comprising:
at least one camera to provide the frames of video data, each frame of video data comprising an image component and a depth component.

18. The system of claim 12, where the object recognition pipeline comprises a region-based convolutional neural network—RCNN—with a path for predicting image segmentation masks.

19. A robotic device comprising:
at least one capture device to provide frames of video data comprising at least colour data;
the system of claim 12;
one or more actuators to enable the robotic device to interact with a surrounding three-dimensional environment; and
an interaction engine comprising at least one processor to control the one or more actuators,
wherein the interaction engine is to use the map of object instances to interact with objects in the surrounding three-dimensional environment.

20. A non-transitory computer-readable storage medium comprising computer-executable instructions which, when executed by a processor, cause a computing device to perform the method of claim 1.

* * * * *